United States Patent
Jaidka

(10) Patent No.: US 12,420,466 B2
(45) Date of Patent: Sep. 23, 2025

(54) APPARATUS AND METHOD FOR COINJECTION OF A MULTILAYER MOLDED ARTICLE WITH A SEGMENTED INTERNAL LAYER

(71) Applicant: HUSKY INJECTION MOLDING SYSTEMS LTD., Bolton (CA)

(72) Inventor: Damish Jaidka, Brampton (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 17/636,702

(22) PCT Filed: Sep. 11, 2020

(86) PCT No.: PCT/CA2020/051225
§ 371 (c)(1),
(2) Date: Feb. 18, 2022

(87) PCT Pub. No.: WO2021/051189
PCT Pub. Date: Mar. 25, 2021

(65) Prior Publication Data
US 2022/0288825 A1    Sep. 15, 2022

Related U.S. Application Data

(60) Provisional application No. 62/902,545, filed on Sep. 19, 2019.

(51) Int. Cl.
*B29C 45/16* (2006.01)
*B29C 45/28* (2006.01)

(52) U.S. Cl.
CPC ...... *B29C 45/1607* (2013.01); *B29C 45/1684* (2013.01); *B29C 2045/1612* (2013.01)

(58) Field of Classification Search
CPC ........ B29C 45/1603; B29C 2949/3028; B29C 2949/302; B29C 2949/22; B29C 2949/24;
(Continued)

(56) References Cited

U.S. PATENT DOCUMENTS 4,781,954 A    11/1988   Krishnakumar et al.
4,808,101 A    2/1989    Schad et al.
(Continued)

FOREIGN PATENT DOCUMENTS

DE    102006040182 A1    3/2008
EP       374247 B1       11/1994
(Continued)

*Primary Examiner* — Armand Melendez
(74) *Attorney, Agent, or Firm* — Wolf, Greenfield & Sacks, P.C.

(57) ABSTRACT

In one aspect, a method of coinjection molding a multilayer article having a multi-segment internal layer is disclosed. A surface layer material is injected into a mold cavity from at least one of an inner outlet and an outer outlet of a multi-channel nozzle. An internal layer material is intermittently injected into the mold cavity from an intermediate outlet of the multi-channel nozzle that is between the inner and outer outlets. The intermittent injecting of the internal layer material is controlled, at least in part, by intermittent opening and closing of the intermediate outlet. An apparatus for coinjection molding the multilayer article with the segmented internal layer is also disclosed.

7 Claims, 14 Drawing Sheets

(58) Field of Classification Search
CPC ............ B29C 45/1643; B29C 45/1646; B29C 2949/3016; B29C 2949/3018; B29C 2949/3036; B29C 2949/303; B29C 2949/3032; B29C 45/1642; B29C 2949/3038; B29C 45/1607; B29C 45/2725; B29C 2045/1648; B29C 2949/0811; B29C 2949/0819; B29C 2949/0829; B29C 2949/3012; B29C 49/06; B29C 2045/273; B29C 2949/0715; B29C 2949/28; B29C 2949/3008; B29C 45/02; B29C 49/071; B29C 2949/082; B29C 2045/165; B29C 2045/1656; B29C 2049/023; B29C 2949/072; B29C 2949/073; B29C 2949/0777; B29C 2949/3026; B29C 2949/0723; B29C 2949/0724; B29C 2949/0732; B29C 2949/0733; B29C 2949/0773; B29C 2949/3022; B29C 45/0046; B29C 49/22; B29C 2045/161; B29C 2045/1612; B29C 2045/1614; B29C 2045/1668; B29C 2045/1685; B29C 2045/1698; B29C 2045/2687; B29C 2045/277; B29C 2045/2872; B29C 2793/009; B29C 2949/0774; B29C 2949/0817; B29C 2949/0835; B29C 2949/0837; B29C 2949/0872; B29C 2949/3009; B29C 45/1657; B29C 45/1684; B29C 49/0005; B29C 49/74; B29C 2045/0051; B29C 2045/1651; B29C 2045/166; B29C 2045/1667; B29C 2049/222; B29C 2049/7832; B29C 2049/7862; B29C 2049/7879; B29C 2949/077; B29C 2949/0772; B29C 2949/0816; B29C 2949/20; B29C 2949/26; B29C 2949/3014; B29C 2949/3034; B29C 2949/3074; B29C 2949/3076; B29C 37/0078; B29C 37/0082; B29C 45/13; B29C 45/16; B29C 45/164; B29C 45/1645; B29C 45/22; B29C 45/2708; B29C 45/2756; B29C 45/30; B29C 45/54; B29C 45/706; B29C 48/03; B29C 48/185; B29C 49/04; B29C 49/08; B29C 49/087; B29C 49/42394; B29C 49/6605; B29C 49/761

See application file for complete search history.

(56) References Cited

U.S. PATENT DOCUMENTS

| | | | |
|---|---|---|---|
| 4,946,365 A | 8/1990 | Kudert et al. | |
| 4,990,301 A | 2/1991 | Krishnakumar et al. | |
| 5,035,931 A * | 7/1991 | Yamada | B29C 45/1643 264/28 |
| 5,098,274 A * | 3/1992 | Krishnakumar | B29C 45/1646 425/562 |
| 6,129,960 A | 10/2000 | Kudert et al. | |
| 6,655,945 B1 | 12/2003 | Gellert et al. | |
| 7,510,387 B2 | 3/2009 | Sicilia | |
| 8,607,999 B2 | 12/2013 | Toyoda et al. | |
| 9,381,689 B2 | 7/2016 | Takeuchi et al. | |
| 2009/0315205 A1 * | 12/2009 | Koumaru | B29C 45/77 425/149 |
| 2010/0007048 A1 | 1/2010 | Schweininger et al. | |
| 2011/0108505 A1 * | 5/2011 | Toyoda | B29C 45/1646 425/130 |
| 2011/0115122 A1 | 5/2011 | Abe et al. | |
| 2015/0014878 A1 * | 1/2015 | Takeuchi | B29C 45/1607 264/40.7 |
| 2016/0151935 A1 | 6/2016 | Simpson | |

FOREIGN PATENT DOCUMENTS

| | | |
|---|---|---|
| JP | H05253973 A | 10/1993 |
| JP | H05309648 A | 11/1993 |
| WO | 2018209429 A1 | 11/2018 |

* cited by examiner

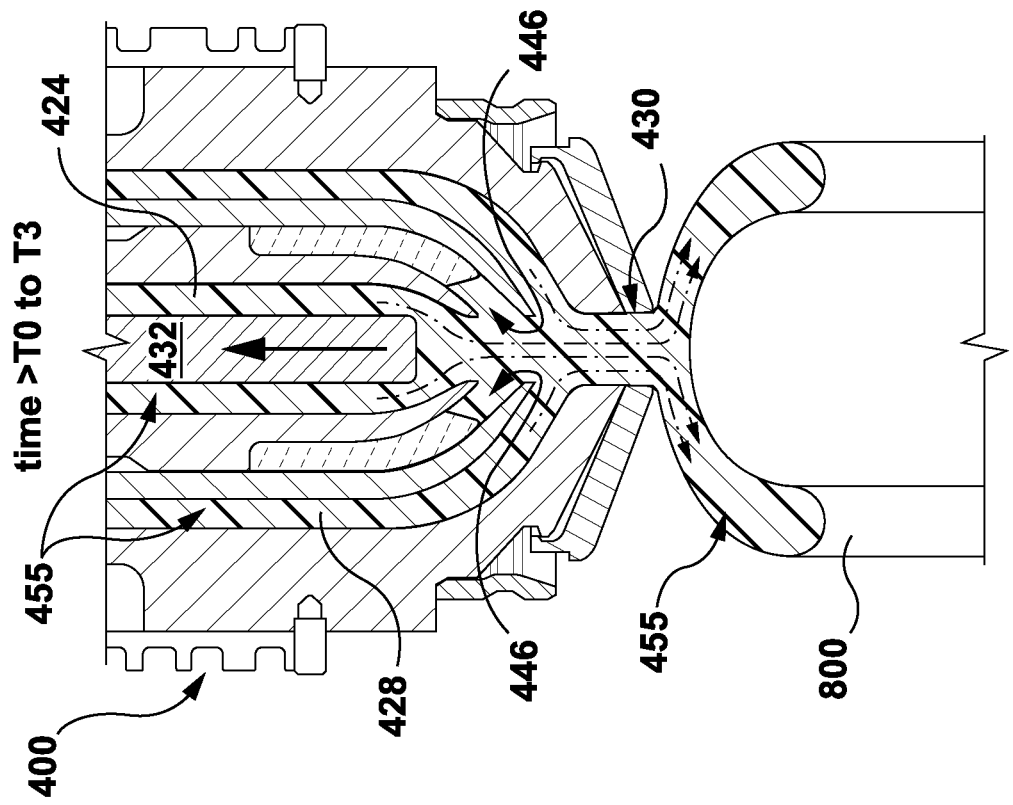

APPARATUS AND METHOD FOR COINJECTION OF A MULTILAYER MOLDED ARTICLE WITH A SEGMENTED INTERNAL LAYER

RELATED APPLICATIONS

This Application is a national stage filing under 35 U.S.C. § 371 of international patent application Serial No. PCT/CA2020/051225, filed Sep. 11, 2020, which claims priority under 35 USC § 119(e) to U.S. provisional patent application Ser. No. 62/902,545, filed Sep. 19, 2019.

TECHNICAL FIELD

The present disclosure relates to injection molding, and more particularly to an apparatus and method for coinjection of a multilayer molded article with a segmented internal layer.

BACKGROUND

A molding apparatus may channel a flow of melted molding material, such as melted plastic or resin, through a distribution network, such as a hot runner, for dispensing into a mold through a nozzle. Dispensing of the melted molding material may occur during injection molding for example. Melted molding material may be dispensed from a nozzle in a substantially annular or cylindrical flow. For example, an annular or cylindrical flow may be dispensed or injected into a mold cavity during injection molding of an article having a generally tubular shape, such as a preform suitable for subsequent blow-molding to form a container such as a plastic beverage bottle for example. The flow may be, or may become, annular as it enters the gate of the mold cavity and may spread to surround a core insert component of the mold cavity.

A multi-channel nozzle having multiple channels for simultaneously dispensing multiple respective layers of material may be used to form multilayer molded articles. For example, a coinjection nozzle may dispense annular inner and outer melt streams of a surface layer material simultaneously with an annular stream of an internal layer material sandwiched between the inner and outer streams. The surface layer material may for example be polyethylene terephthalate (PET), and the internal layer material may for example comprise a barrier material (e.g. an oxygen scavenger material) suitable for protecting subsequent contents of the molded article from outside contamination (e.g. oxidation).

It may be desirable to incorporate an internal layer into only certain areas of a molded article, such as only in the body area (side wall) of a preform, and not in other areas, such as the closed base area or neck finish area of a preform. Moreover, it may be desirable to maximize a degree of control over the placement within the molded article of the internal layer material and to make the edges the internal layer material as well-defined or "crisp" as possible within the encapsulating surface material. Inaccurately placed, poorly defined, uneven, or thin leading or trailing edges of internal layer material may be undesirable, e.g. for aesthetic reasons or for reasons of cost. In respect of the latter, it may be cost-effective to limit the use of internal layer material as much as possible, since the internal layer material may be more expensive that the surface layer material.

SUMMARY

According to one aspect of the present disclosure, there is provided a method of coinjection molding a multilayer article having a multi-segment internal layer, comprising: injecting a surface layer material into a mold cavity from at least one of an inner outlet and an outer outlet of a multi-channel nozzle; and intermittently injecting an internal layer material into the mold cavity from an intermediate outlet of the multi-channel nozzle, the intermediate outlet being between the inner and outer outlets of the multi-channel nozzle, wherein the intermittent injecting of the internal layer material is controlled, at least in part, by intermittent opening and closing of the intermediate outlet.

In some embodiments, the intermittent injecting of the internal layer material comprises: closing the intermediate outlet; pre-compressing the internal layer material upstream of the closed intermediate outlet; and then forming each of a plurality of internal layer segments of the multilayer article by:

opening the intermediate outlet of the multi-channel nozzle to release a stream of internal layer material; and then closing the intermediate outlet of the multi-channel nozzle to terminate the stream of the internal layer material.

The method may further comprise, for each of the plurality of internal layer segments of the multilayer article: upon the opening the intermediate outlet, activating an upstream injection unit to commence injection of the internal layer material from the intermediate outlet; and upon the closing the intermediate outlet, deactivating the upstream injection unit.

In some embodiments, a first one of the plurality of internal layer segments has a first axial extent and a second one of the plurality of internal layer segments has a second axial extent less than the first axial extent. In such embodiments, the forming of the first and second internal layer segments may comprise releasing the internal layer material from the intermediate outlet for first and second durations respectively, wherein the first duration is longer than the second duration.

In some embodiments, a first one of the plurality of internal layer segments has a first thickness and a second one of the plurality of internal layer segments has a second thickness less than the first thickness. In such embodiments, the opening of the intermediate outlet may comprise, for the forming of the first internal layer segment of the first thickness, fully opening the intermediate outlet, and for the forming of the second internal layer segment of the second thickness, only partially opening the intermediate outlet.

In some embodiments, the injecting of the surface layer material into the mold cavity comprises: before the intermittent injecting of the internal layer material, injecting the surface layer material into the mold cavity from both of the inner outlet and the outer outlet of the multi-channel nozzle; and during the intermittent injecting of the internal layer material, injecting the surface layer material into the mold cavity from only the outer outlet of the multi-channel nozzle with the inner outlet in a closed state.

In some embodiments, the multi-channel nozzle comprises a reciprocable valve stem, each of the intermediate and outer outlets comprises an inwardly facing annular outlet, and the intermittent opening and closing of the intermediate outlet comprises reciprocating the valve stem between a first position in which the valve stem does not block either of the intermediate or outer outlets and a second position in which the valve stem blocks the intermediate outlet but does not block the outer outlet.

In another aspect of the present disclosure, there is provided an apparatus for coinjection molding a multilayer article having a segmented internal layer, the apparatus comprising: a mold cavity defined within a mold; a multi-channel coinjection nozzle having inner and outer outlets, each of the inner and outer outlets for injecting a surface layer material into the mold cavity, and an intermediate outlet between the inner and outer outlets for injecting an internal layer material into the mold cavity; and a controller configured to cause the apparatus to: inject the surface layer material into the mold cavity from at least one of the inner outlet and the outer outlet of the multi-channel coinjection nozzle; and intermittently inject the internal layer material into the mold cavity from the intermediate outlet at least in part by intermittently opening and closing the intermediate outlet, each discrete injection of the internal layer material for forming a respective one of a plurality of discrete internal layer segments of the multilayer article.

In some embodiments, the controller is configured to control the apparatus to intermittently inject the internal layer material by: closing the intermediate outlet; pre-compressing the internal layer material upstream of the closed intermediate outlet; and then forming each of a plurality of internal layer segments of the multilayer article by: opening the intermediate outlet of the multi-channel nozzle to release a stream of internal layer material; and then closing the intermediate outlet of the multi-channel nozzle to terminate the stream of the internal layer material. In such embodiments, the controller may be configured to further control the apparatus to, for each of the multiple internal layer segments of the multilayer article: upon the opening the intermediate outlet, activate an upstream injection unit to commence injection of the internal layer material from the intermediate outlet; and upon the closing the intermediate outlet, deactivate the upstream injection unit.

In some embodiments, a first one of the plurality of internal layer segments has a first axial extent, a second one of the plurality of internal layer segments has a second axial extent less than the first axial extent, and the forming of the first and second internal layer segments comprises releasing the internal layer material from the intermediate outlet for first and second durations respectively, wherein the first duration is longer than the second duration.

In some embodiments, a first one of the plurality of internal layer segments has a first thickness, a second one of the plurality of internal layer segments has a second thickness less than the first thickness, and the controller is configured to, for the first internal layer segment of the first thickness, fully open the intermediate outlet, and for the second internal layer segment of the second thickness, only partially open the intermediate outlet.

In some embodiments, the controller is configured to control the injecting of the surface layer material into the mold cavity by: before the intermittent injecting of the internal layer material, injecting the surface layer material into the mold cavity from both of the inner outlet and the outer outlet of the multi-channel nozzle; and during the intermittent injecting of the internal layer material, injecting the surface layer material into the mold cavity from only the outer outlet of the multi-channel nozzle with the inner outlet in a closed state.

In some embodiments, the multi-channel nozzle comprises a reciprocable valve stem, each of the intermediate and outer outlets comprises an inwardly facing annular outlet, and the intermittently opening and closing of the intermediate outlet comprises reciprocating the valve stem between a first position in which the valve stem does not block either of the intermediate or outer outlets and a second position in which the valve stem blocks the intermediate outlet but does not block the outer outlet.

Other features will become apparent from the drawings in conjunction with the following description.

DESCRIPTION OF THE DRAWINGS

The non-limiting embodiments will be more fully appreciated by reference to the accompanying drawings, in which:

FIGS. 8, 9, 10, 11, 12, 13, 14, 15, 16, and 17 are schematic diagrams of the nozzle of FIG. 4 and an associated mold cavity in longitudinal cross section at various stages during a single injection molding cycle;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

In this document, any use of the term "exemplary" should be understood to mean "an example of" and not necessarily to mean that the example is preferable or optimal in some way. Terms such as "downwardly" or "above" may be used to describe features of some embodiments in this description but should not be understood to necessarily connote an orientation of the embodiments during use.

Figure 1:
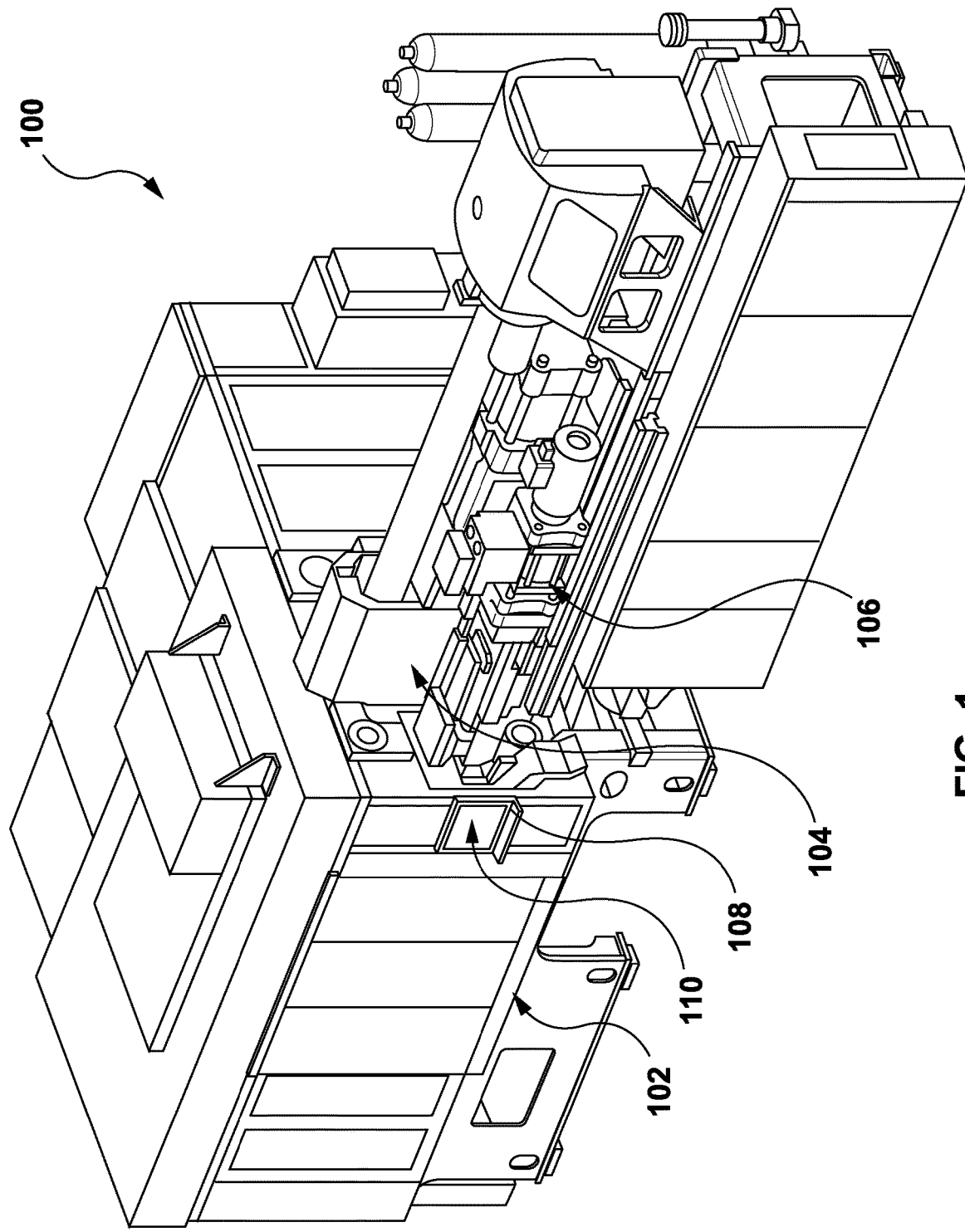
FIG. 1 is a perspective view of an injection molding machine for molding multilayer preforms.

FIG. 1 depicts an injection molding machine 100 in perspective view. The exemplary injection molding machine 100 is for molding multilayer articles, specifically preforms, such as the example preform 200 of FIG. 2 (described below).

The example injection molding machine 100 depicted in FIG. 1 comprises an enclosure 102 housing a clamp unit, a fixed platen, a movable platen, and a mold mounted therebetween, none of which are visible in FIG. 1. The injection molding machine 100 further comprises first and second injection units 104 and 106. The first injection unit 104 is for plasticizing (melting) and injecting a surface layer material, which may for example be PET. The second injection unit 106 is for plasticizing and injecting an internal layer material, which may for example be a barrier or oxygen-scavenging material, or a PET material with a colorant additive. Both the surface and internal layer materials may be considered as forms of molding material. As will be appreciated, the different materials will be used to form different layers of the preform 200, respectively. Each injection unit may for example utilize a reciprocating screw or plunger for injecting molding material into mold cavities.

A controller 108 controls the operation of injection molding machine 100 based on human operator input or based on a preset control sequence, among other functions. In the present embodiment, the controller 108 comprises at least one processor in communication with volatile or non-volatile memory storing computer-readable program code stored on a tangible medium, e.g., ROM, optical disk, USB drive, or magnetic storage medium. In some embodiments, the computer-readable program code may be transmitted to the memory via a modem or communications adapter communicatively coupled to a network, e.g. a wide area network such as the Internet. Control instructions may be entered by a human operator via human-machine interface (HMI), which may for example be a multi-function touchscreen 110 that forms part of, or is coupled to, the controller 108. The controller 108 may for example be a Beckhoff® model CP22xx Panel PC with Intel® Core™ i processor, or another model of industrial PC.

A hot runner (not shown) within enclosure 102 defines a network of channels for conveying molten surface layer material and molten internal layer material from injection units 104 and 106 respectively to each of a plurality of multi-channel nozzles, described below. Each nozzle is positioned near an associated mold cavity defined in the mold. Each mold cavity is a negative shape (space) in the shape of the article to be molded, which in this example is preform 200 of FIG. 2. The number of mold cavities that can be simultaneously filled by molding machine 100 is typically greater than one and may vary between embodiments.

Figure 2:
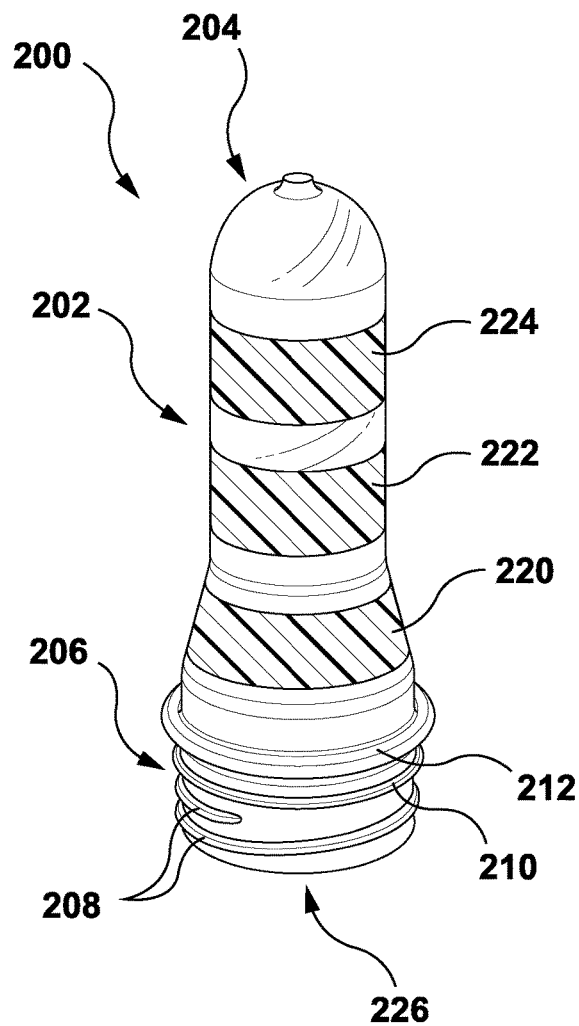
FIG. 2 is a perspective view of a preform molded by the injection molding machine of FIG. 1.
Figure 3:
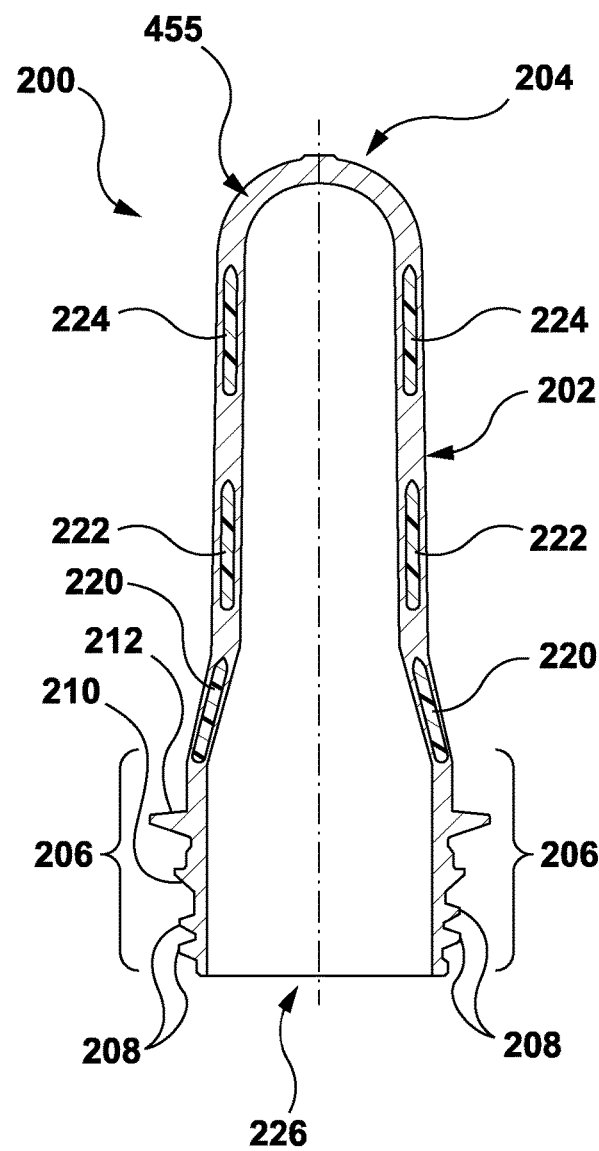
FIG. 3 is a longitudinal cross section of the preform of FIG. 2.

An example preform 200 produced by the injection molding machine 100 of FIG. 1 is shown in FIG. 2 in perspective view and in FIG. 3 in longitudinal cross section. As illustrated, the preform 200 has an elongate body 202, a hemispheric closed base 204, and a neck finish 206. The neck finish 206 of this example preform includes various external features including threads 208 for accepting and retaining a closure such as a threaded cap, an anti-pilfer bead 210, and a support ledge 212.

As best seen in FIG. 3, the preform 200 is made primarily from the surface layer material 455, with the exception of segments 220, 222, and 224 which are comprised of the internal layer material 466. The segments 220, 222, and 224 of internal layer material 466 are entirely encapsulated by the surface layer material 455 in the present embodiment. Each of the segments 220, 222 and 224 of the illustrated embodiment is substantially annular, with segment 220 being flared, i.e. wider at the bottom of FIGS. 2 and 3 than at the top, by virtue of the flaring of the preform body 202 immediately adjacent to neck finish 206 (i.e. immediately above neck finish 206 in FIGS. 2 and 3). In some embodiments, the placement and number of the segments is dictated primarily by aesthetic considerations.

The orientation of the preform 200 in FIGS. 2 and 3 is inverted, i.e. the open end 226 opposite base 204 points downwardly. This is not necessarily the orientation in which preforms are molded in practice by molding machine 100 or alternative mold embodiments.

Figure 4:
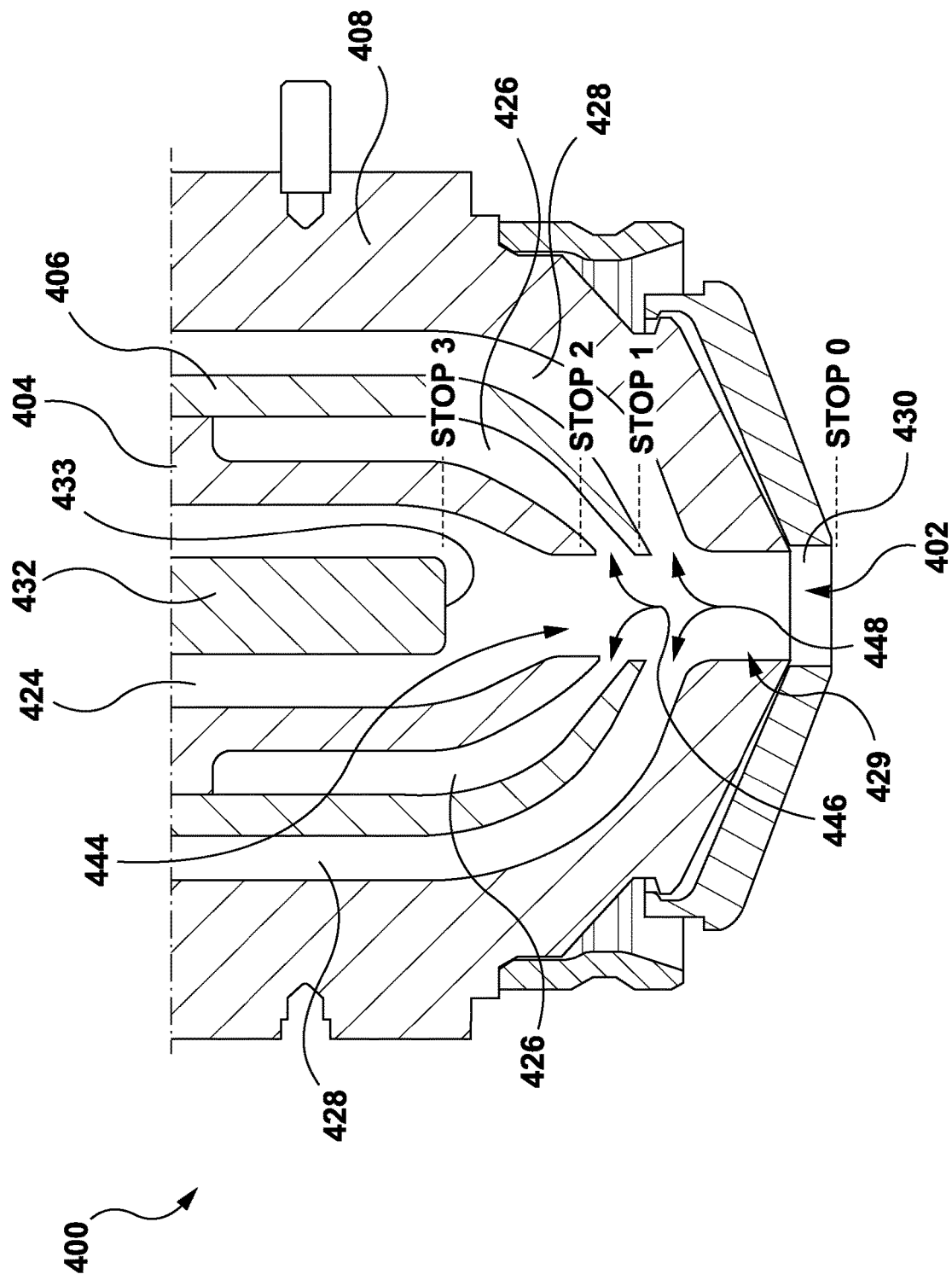
FIG. 4 is a longitudinal cross section of a portion of a hot runner nozzle used to inject molding material to form the preform of FIGS. 2 and 3.

The preform 200 of FIGS. 2 and 3 is formed from molten surface layer material 455 and molten internal layer material 466 injected into a mold cavity by an associated multi-channel nozzle 400 of the hot runner. FIG. 4 depicts a portion of the hot runner nozzle 400 in longitudinal cross section. The depicted portion of nozzle 400 is the downstream-most end of the nozzle, including the nozzle tip 402 from which melt is discharged into the mold cavity.

In the present embodiment, nozzle 400 is an assembly formed from three nested components: an innermost nozzle insert 404, an intermediary nozzle insert 406, and an outermost nozzle insert 408. In alternative embodiments, the nozzle may be formed in other ways, e.g. as a unitary component made using additive manufacturing techniques, such as direct metal laser sintering (DMLS). The example nozzle 400 has a substantially cylindrical shape, as does each of its component nozzle inserts 404, 406, and 408, but this is not a requirement.

Nozzle 400 of FIG. 4 defines three channels for conveying melt.

A first, centrally disposed channel 424 defined by the innermost nozzle insert 404 provides a passage for conveying melted surface layer material, received from the first injection unit 104, axially towards nozzle tip 402. Channel 424 also accommodates an axially reciprocable valve stem 432 that is used for controlling the flow of both types of melt (i.e. surface layer material and internal layer material) in the present embodiment, as will be described. Specifically, the channel 424 and valve stem 432 collectively define an annular passage through which surface layer material is flowable until the melt clears the end of valve stem 432 (when the valve stem 432 is in the fully retracted position of FIG. 4) and exits outlet 444 as a substantially cylindrical flow. Upon exiting outlet 444, the melt enters nozzle combination area 429 for combination with one or more other melt streams, as will be described. Channel 424 may be referred to as inner channel 424, and outlet 444 may accordingly be referred to as the inner outlet 444.

A second, substantially annular channel 426 is defined between the innermost nozzle insert 404 and the intermediary nozzle insert 406. The second channel 426 conveys melted internal layer material received from the second injection unit 106 axially towards an inwardly facing annular outlet 446. Upon exiting the annular outlet 446, the annular melt stream flows into nozzle combination area 429 for combination with one or more other melt streams. Channel 426 may be referred to as the intermediate channel 426, and outlet 446 may accordingly be referred to as the intermediate outlet 446.

A third, substantially annular channel 428 is defined between the intermediary nozzle insert 406 and the outermost nozzle insert 408. The third channel 428 conveys surface layer material received from the first injection unit 104 to inwardly facing annular outlet 448. Upon exiting outlet 448, the discharged melt enters nozzle combination area 429, where it may be combined with one or more other melt streams. Channel 428 may be referred to as the outer channel 428, and outlet 448 may accordingly be referred to as the outer outlet 448. In the present embodiment, the outer channel 428 is substantially concentric with each of the intermediate channel 426 and the inner channel 424.

Valve stem 432 is used to control the flow of molding material into the molding cavity associated with nozzle 400. The valve stem 432 is controlled by controller 108 by way of an actuator (not depicted) that reciprocates the valve stem 432 between four positions or stops.

The first valve stem position is the fully opened position depicted in FIG. 4, in which the distal end 433 of the valve stem is positioned at axial "Stop 3." In this position, the valve stem 432 does not impede the flow of molding material from any of the inner outlet 444, intermediate outlet 446, or outer outlet 448. This valve stem position is referred to herein as Position 3, with the number 3 representing the number of open (unblocked) nozzle outlets (i.e. outlets 444, 446, and 448).

The second position is a mostly open position in which the end 433 of valve stem 432 is advanced (downwardly in FIG. 4) to the axial position marked as "Stop 2." When the valve stem 432 is in this position, it blocks (closes) inner outlet 444 and thereby prevents surface layer material from flowing therefrom. Intermediate outlet 446 and outer outlet 448 remain open. This valve stem position is referred to herein as Position 2, with the number 2 representing the number of open nozzle outlets (i.e. outlets 446 and 448).

The third position is a mostly closed position in which the end 433 of valve stem 432 is advanced to the axial position marked as "Stop 1" in FIG. 4. When the valve stem 432 is in this position, it blocks both of inner outlet 444 and intermediate outlet 446 and thereby prevents surface layer material and internal layer material, respectively, from flowing therefrom. Outer outlet 448 remains unblocked, permitting surface layer material from injection unit 104 to flow into combination area 429. This valve stem position is referred to as Position 1, reflecting the single nozzle outlet (outlet 448) that is open in this position.

Finally, the fourth position is a fully closed position in which the end 433 of valve stem 432 is advanced to the axial position marked as "Stop 0" in FIG. 4 within gate area 430. When the valve stem 432 is in this position, it blocks each of the inner outlet 444, intermediate outlet 446, and outer outlet 448, thereby preventing molding material from flowing from any of those outlets. This valve stem position may be referred to as Position 0, with the number 0 reflecting the number of open nozzle outlets (i.e. none).

In order to effectively block the flow of melt from outlets 444, 446, and/or 448, the clearance between the valve stem 432 and each of these outlets may for example be on the order of microns. The clearance may vary between embodiments based on, e.g., the viscosity of the melted molding materials in the respective channels 424, 426, and 428, the pressure of the melt within nozzle 400 immediately upstream of the valve stem 432, and other factors.

As will be described, the controller 108 moves the valve stem 432 between the various positions shown in FIG. 4 in a particular sequence during an injection molding cycle to facilitate injection molding of the preform 200 of FIGS. 2 and 3 with its encapsulated internal layer segments 220, 222, and 224.

Figure 5:
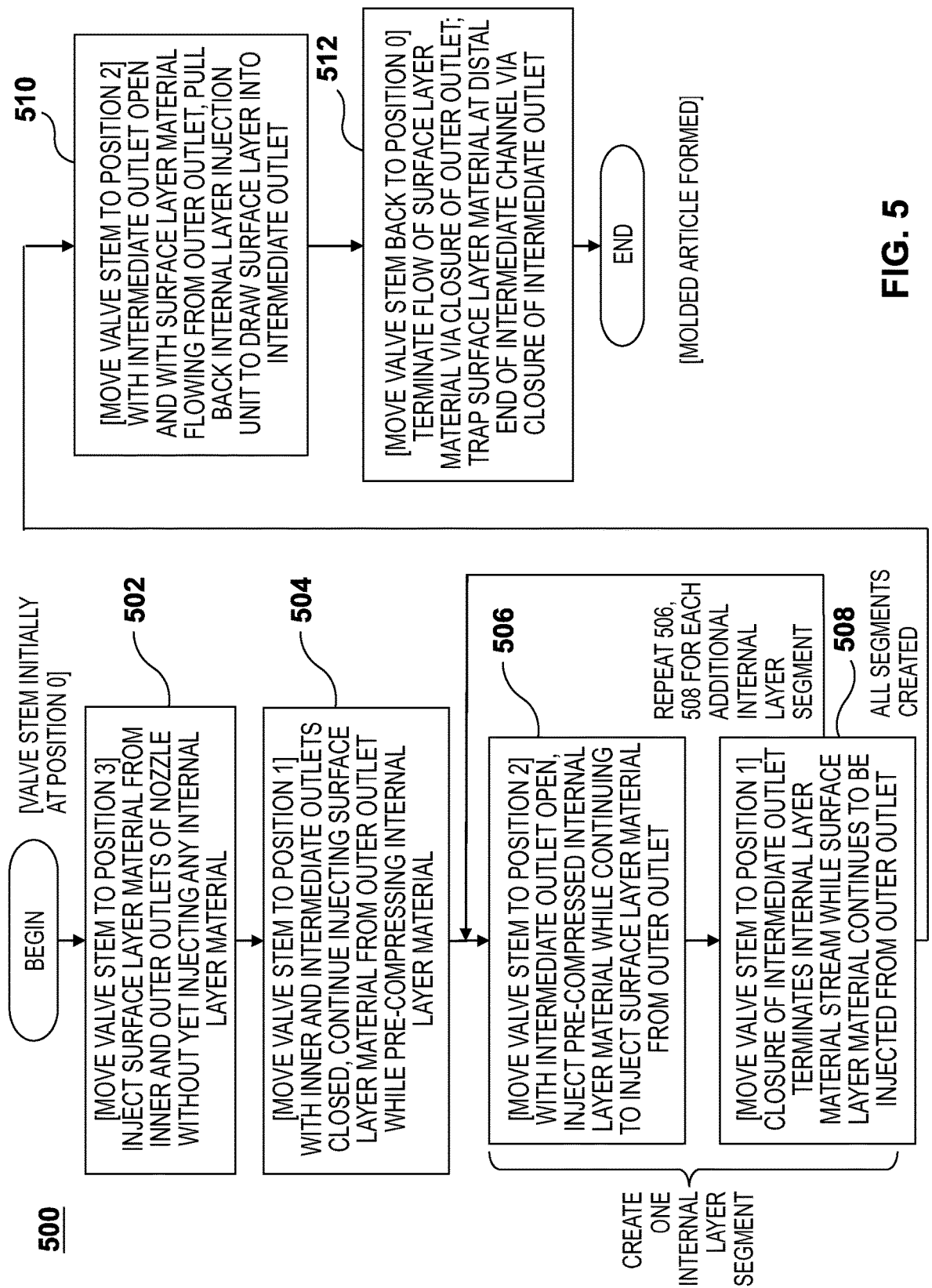
FIG. 5 is a flowchart of operation of the molding machine of FIG. 1 for forming the preform of FIG. 2 over the course of a single molding cycle.
Figure 6:
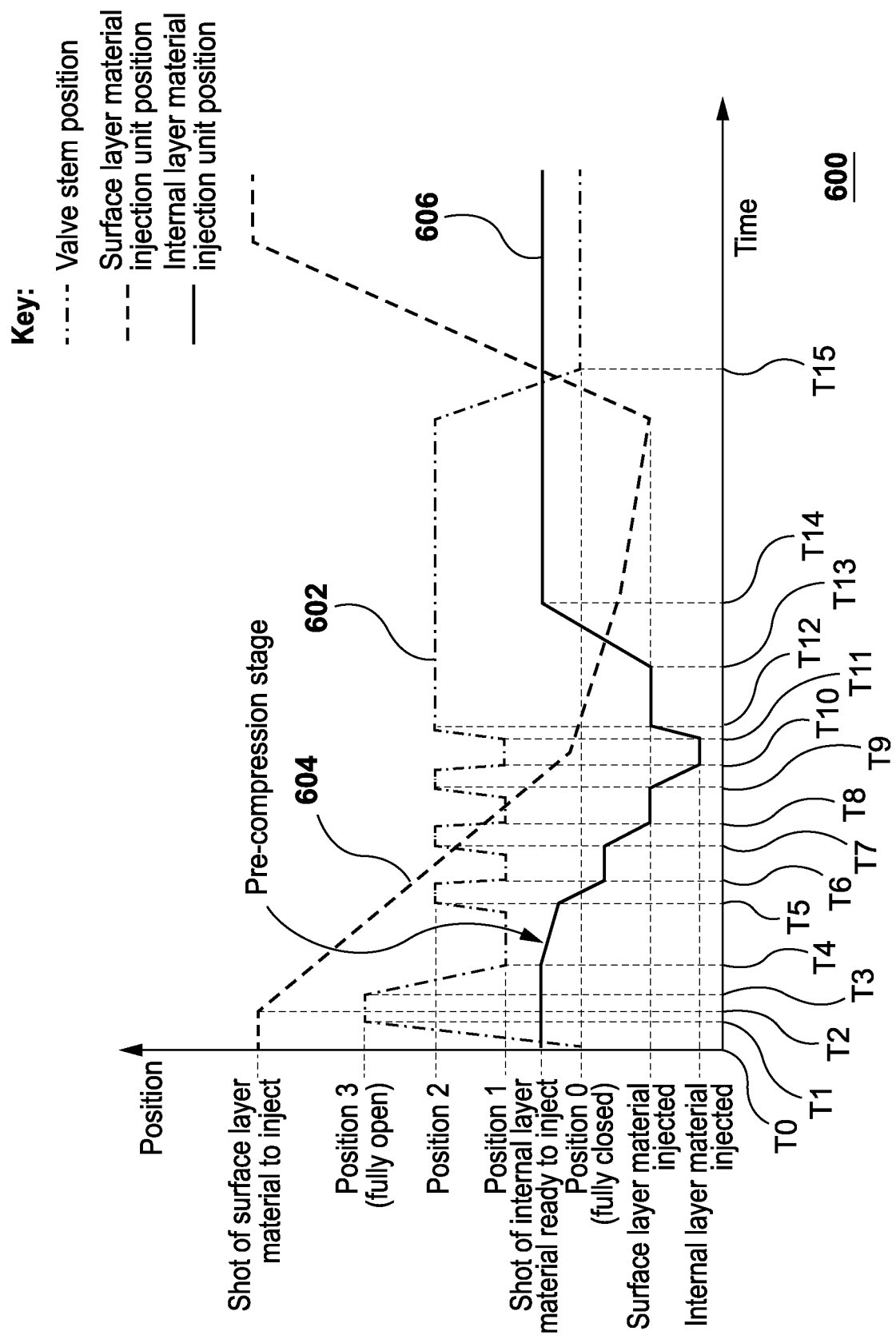
FIG. 6 is a graph showing the position of the valve stem, first injection unit, and second injection unit of the molding machine of FIG. 1 during a single injection molding cycle.
Figure 7:
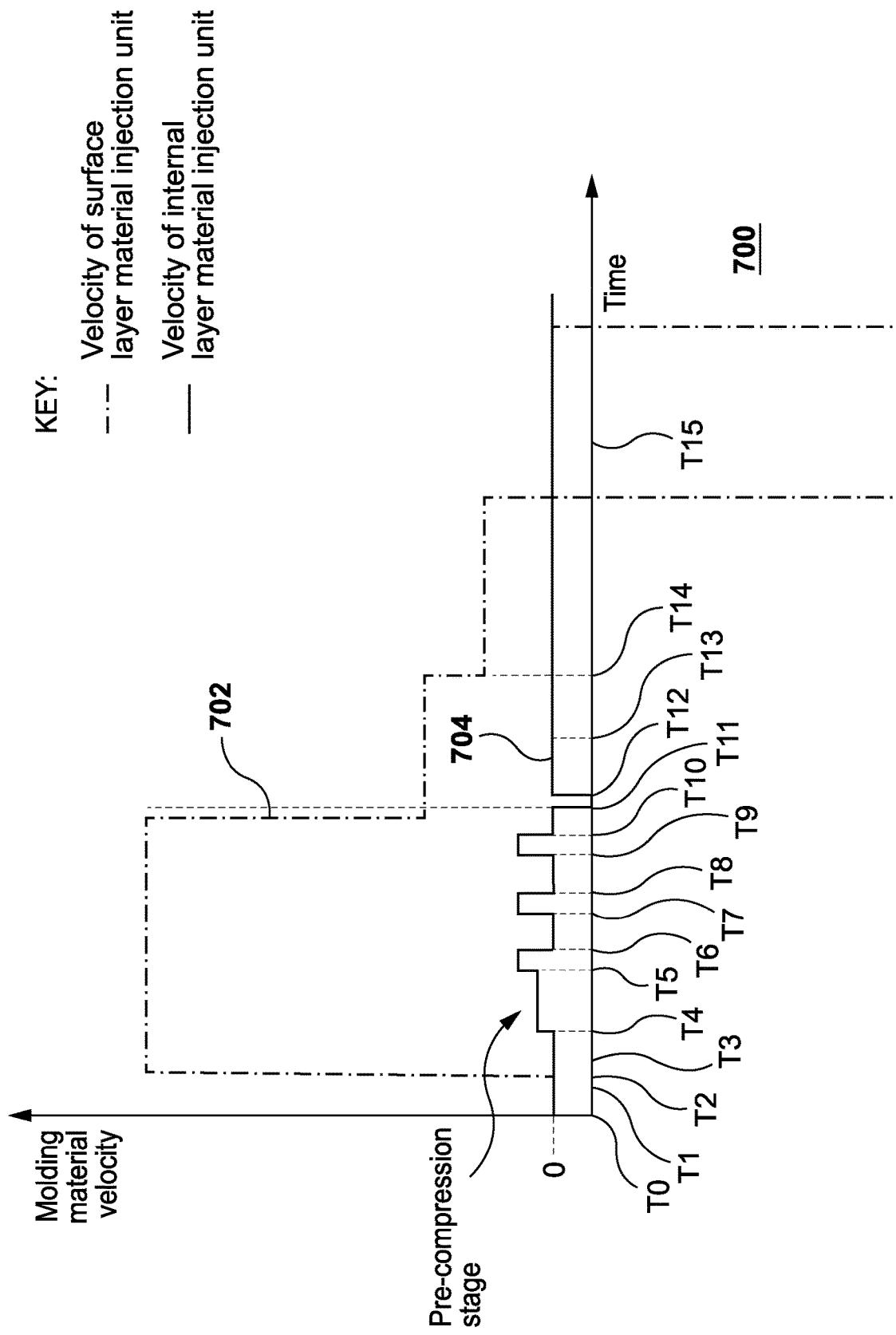
FIG. 7 is a graph showing the velocity of melted surface layer material and melted internal layer material during a single injection molding cycle.

Operation 500 of the molding machine 100 for coinjection of a multilayer molded article with a segmented internal layer during a single injection molding cycle is depicted in FIG. 5 in the form of a flowchart. Operation 500 will be described in conjunction with FIGS. 6 and 7. FIG. 6 depicts a graph 600 showing the positions of three moving components of the molding machine 100 over the course of a single injection molding cycle: the valve stem 432, the injection unit 104, and injection unit 106. For the latter two components, the term "position" refers to the position of the driving element used to drive melted molding material, such as a plunger of a shooting pot or a reciprocating screw within an extruder. FIG. 7 depicts a graph 700 showing the velocity of the surface layer material and of the internal layer material over the course of a single injection molding cycle. Reference will also be made to FIGS. 8-17, which schematically depict, in longitudinal cross section, the nozzle 400 of FIG. 4 and an associated mold cavity 800 at various stages of formation of a preform 200 during a single injection molding cycle.

Referring to FIG. 8, at time T0, which represents the beginning of an injection molding cycle, the valve stem 432 of nozzle 400 is in Position 0, i.e. the fully closed position. In that position, the valve stem 432 blocks (i.e. closes) the inner outlet 444, intermediate outlet 446, and outer outlet 448, thereby preventing any surface layer material 455 or any internal layer material 466 from flowing. The mold cavity 800 (shown only in part in FIG. 8) associated with the nozzle 400, which defines a negative space in the shape of preform 200, is initially empty, with any preform from a previous molding cycle having been ejected.

In the embodiment illustrated in FIG. 8, it can be seen that, at time T0, the distal end of intermediate channel 426, immediately upstream of intermediate outlet 446, contains a small amount of surface layer material 455. This is despite the fact that the intermediate channel 426 is intended to flow internal layer material 466 from injection unit 106. The manner in which the distal end of channel 426 is filled with surface layer material 455 at the end of the previous molding cycle and the rationale for doing so are described below.

Referring to FIG. 6, the positions of the valve stem 432, first injection unit 104 for injecting surface layer material 455, and second injection unit 106 for injecting internal layer material 466, are depicted by plots 602, 604, and 606 respectively. At time T0, the valve stem 432 is at Position 0, consistently with FIG. 8 (described above). Moreover, at time T0, each of the injection units 104 and 106 is in a ready position for injecting a shot of its respective molding material. In graph 600, the plot 606 for injection unit 106 is located below the plot 604 for injection unit 104. These relative locations reflect the generally smaller amount of internal layer material injected in a single molding cycle by the former compared to the amount of surface layer material injected by the latter in the present embodiment. For clarity, plots 604 and 606 of FIG. 6 share a common scale on the vertical "position" axis, whereas plot 602 does not share a common scale with either of plots 604 or 606 in the illustrated embodiment. In the graph of FIG. 6, a downward trend of plot 604 or 606 over time indicates positive movement of the respective driving element, i.e. injection of the respective molding material, whereas an upward trend indicates negative (reverse) movement thereof.

Referring to FIG. 7, at time T0, the velocity of each of the surface layer material and the internal layer material is zero, i.e. the driving elements of the respective injection units are stationary and no molding material flows within the nozzle 400. For clarity, the present disclosure refers interchangeably to the velocity of an injection unit and the velocity of the (corresponding) molding material.

Referring to FIG. 5, in a first operation 502, the valve stem 432 is moved from Position 0 (the fully closed position) to Position 3 (the fully open position), and injection of the surface layer material 455 by injection unit 104 is commenced. The surface layer material 455 is injected via both the inner and outer outlets 444 and 448, in order to maximize the rate of flow and in turn minimize the duration of injection of operation 502. Notably, the other injection unit 106 is not yet activated in operation 502, i.e. no internal layer material is yet made to flow from the intermediate outlet 446. The initial flow of molding material is limited to only surface layer material because it will ultimately occupy the neck finish area 206 of the preform 200, which should be kept free of any internal layer material in the present embodiment.

Referring again to graph 600 of FIG. 6, it will be appreciated that operation 502 of FIG. 5 commences just after time T0 and continues to time T3. Once both of the inner and outer outlets 444 and 448 have been opened by retraction of valve stem 432 to Position 3, Injection of the surface layer material 455 commences at time T2. Injection of surface layer material by unit 104 is represented by the downward trend of the plot 604 in FIG. 6. It will be appreciated that, in plots 604 and 606 of FIG. 6, the lower the position on the vertical axis, the greater the amount of injected molding material. Referring to FIG. 7, the velocity of the surface layer material 455, represented by plot 702, increases at time T2. It will be appreciated that, although the increase is depicted in plot 702 as occurring instantaneously (for simplicity and for consistency with FIG. 6), the increase may actually occur over a short time interval. The same is true for other changes in velocity of the surface layer material 455 depicted in FIG. 7. No internal layer material injection is performed at this stage, as reflected by the zero velocity of plot 704 in FIG. 7, and the zero slope of the plot 606 representing the position of injection unit 106 in FIG. 6, through time T4.

The state of the nozzle 400 and mold cavity 800 during operation 502 of FIG. 5 are schematically depicted in FIG. 9. As illustrated, surface layer material 455 from both of the inner and outer channels 424 and 428 flows into mold cavity 800 via gate area 430. It will be appreciated that the stream of surface layer material 455 from the inner channel 424 flowing past intermediate outlet 446 may have a tendency to "drag" some of the material from outlet 446 along with it. Advantageously, to the extent that this does occur, the dragged material will also be surface layer material 455, in view of the small amount of surface layer material 455 occupying the distal end of channel 426. As such, the initial flow of surface layer material 455 during the current molding cycle is kept free from contamination by any internal layer material 466. It is for this reason that the distal end of intermediate channel 426 was filled with small amount of surface layer material 455 in the previous injection molding cycle, using a mechanism that will be described below.

Figure 10:
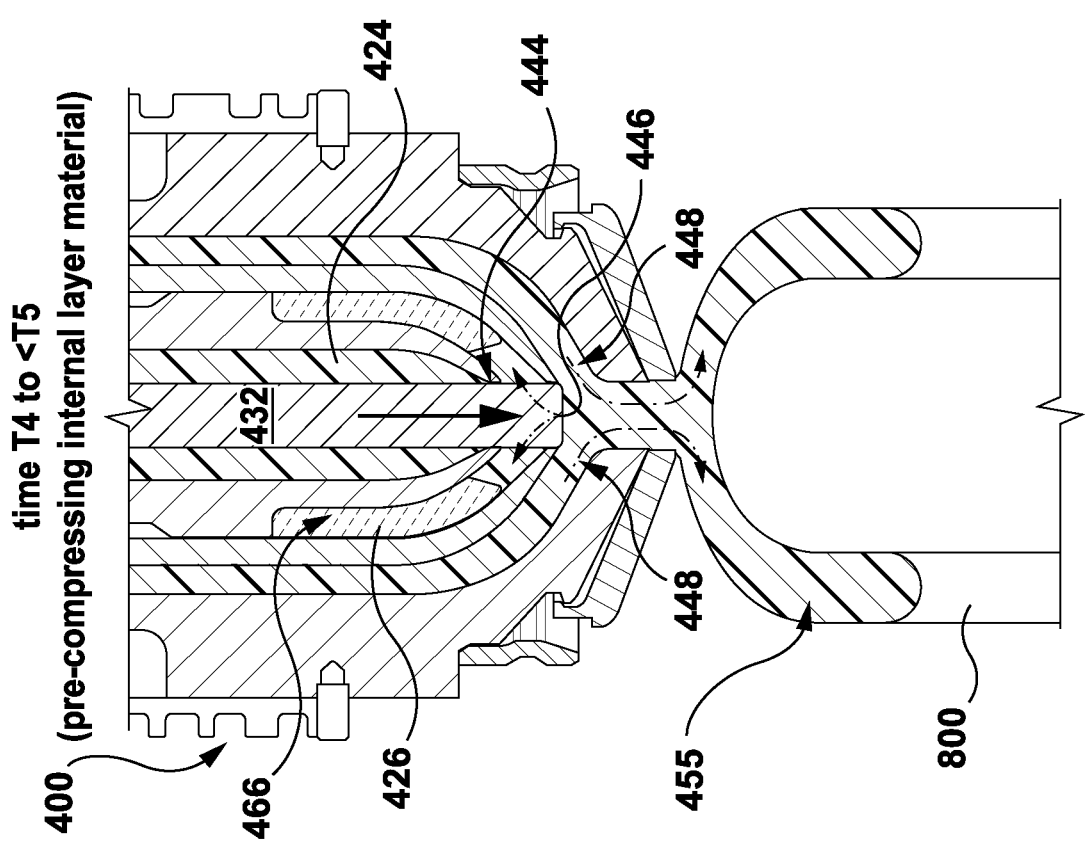

Referring back to FIG. 5, in a subsequent operation 504, controller 108 causes valve stem 432 to move from Position 3 to Position 1 as shown in FIG. 10. Operation 504 occurs from time T4 to just before time T5 (see FIGS. 6 and 7). In Position 1, the valve stem 432 physically blocks (i.e. has closed) both the inner outlet 444 and the intermediate outlet 446. Closure of inner outlet 444 ceases the flow of surface layer material 455 from inner channel 424. However, the surface layer material 455 continues to flow from the still-open outer outlet 448. In fact, the flow rate of material 455 from outer outlet 448 will increase upon the closure of inner outlet 444 because the overall the volumetric flow rate of material 455 flowing into the cavity (i.e. speed of injection unit 104) remains unchanged. This is in view of the constant velocity of the driving element of injection unit 104 during operation 504.

Operation 504 additionally comprises pre-compressing the internal layer material 466 in nozzle 400. In the present embodiment, pre-compression is performed by the injection unit 106, under control of controller 108, after the intermediate outlet 446 has been closed.

The rationale for pre-compressing the internal layer material 466 is primarily twofold. Firstly, the inventor has noted that pre-compression combined with a physical unblocking of the intermediate outlet 446 results in a well-defined leading edge of the internal layer material 466, which may be desirable for the internal layer as earlier noted. Secondly, the lag time between instructing internal layer material flow and actual flow may be shorter with pre-compression and physical unblocking than it might otherwise be, e.g. if the injection unit 104 were solely responsible for initiating flow. In the latter case, lag time between instructing flow and actual flow may result from various factors, such as melt compressibility, bends and/or constrictions in the hot runner manifold between the injection unit 104 and nozzle 400, and other reasons. By performing pre-compression in parallel with the initial injection of surface layer material in operation 504, the benefit of a reduced lag time may be enjoyed without the penalty of added delay, e.g. as might result if pre-compression were performed before the commencement of molding material injection. Pre-compression of the internal layer material 466 may also decrease the duration of injection of the internal layer material, which may facilitate shorter mold cycle times. In some embodiments, there may be some pre-compression of the surface layer material in addition to the internal layer material, e.g. to minimize cycle times.

In FIG. 6, pre-compression of the internal layer material is represented by the downward trend (negative slope) of the plot 606 representing the position of injection unit 106 between times T4 and T5 while the intermediate outlet 446 is closed (i.e. with valve stem 432 in Position 1).

Figure 11:
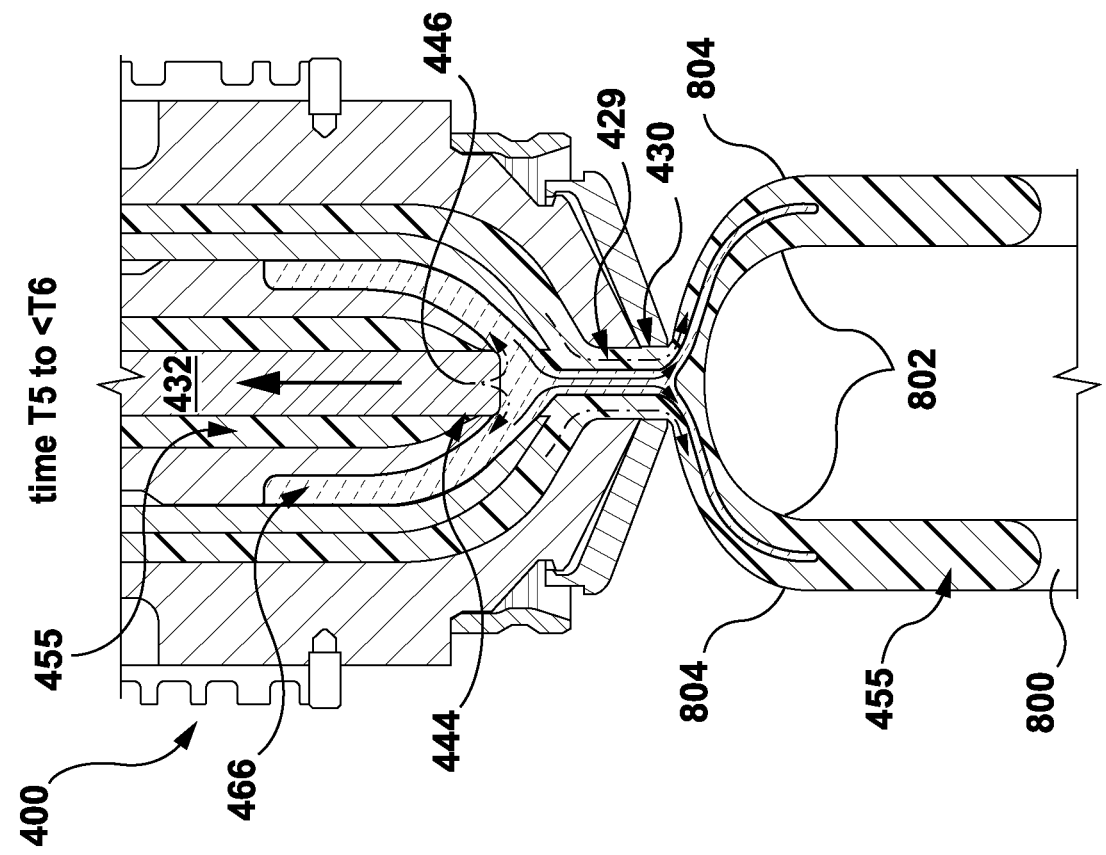

In a subsequent operation 506 (FIG. 5), controller 108 opens intermediate outlet 446 by causing valve stem 432 to move from Position 1 to Position 2 as shown in FIG. 11. Operation 506 occurs from time T5 to just before time T6 (see FIGS. 6 and 7). Opening the intermediate outlet 446 (FIG. 11) releases a stream of the pre-compressed internal layer material 466 into mold cavity 800, with a well-defined leading edge, and thereby initiates injection of an internal layer segment. The internal layer material 466 entering the mold cavity 800 flows along with the surface layer material 455, which continues to be injected from outer outlet 448.

Although not expressly depicted in FIG. 11 (or any subsequently referenced drawings), when the valve stem 432 is in Position 2 as shown in FIG. 11, the internal layer material 466 entering mold cavity 800 may be biased somewhat closer to the core 802 side of mold cavity 800 than to the cavity side 804 within the cross-sectional widthwise extent of the preform wall. The reason is that inner outlet 444 remains closed, preventing any surface layer material 455 from flowing centrally into combination area 429 and through the middle of gate area 430 into mold cavity 800. Nevertheless, the internal layer material 466 entering mold cavity 800 remains encapsulated by the surface layer material 455 of the preform wall. The reason is that at least some surface layer material 455 from the initial injection of operation 502 has by then coated and adhered to the core 802 side of the cavity 800. The degree of bias may impact upon the aesthetic appearance of the molded container into which the preform may be subsequently blow-molded, and may accordingly be chosen on an application-specific basis.

Referring again to FIG. 6, it can be seen from the negative slope of plot 606 that the driving element of injection unit 106 advances linearly between time T5 and T6, corresponding with the injection of internal layer material 466 into the mold cavity at a steady rate during this interval. In FIG. 7, it can be seen that the velocity of the driving element during injection operation 506 is greater than the velocity of the driving element during the pre-compression time interval T4 to T5.

Figure 12:
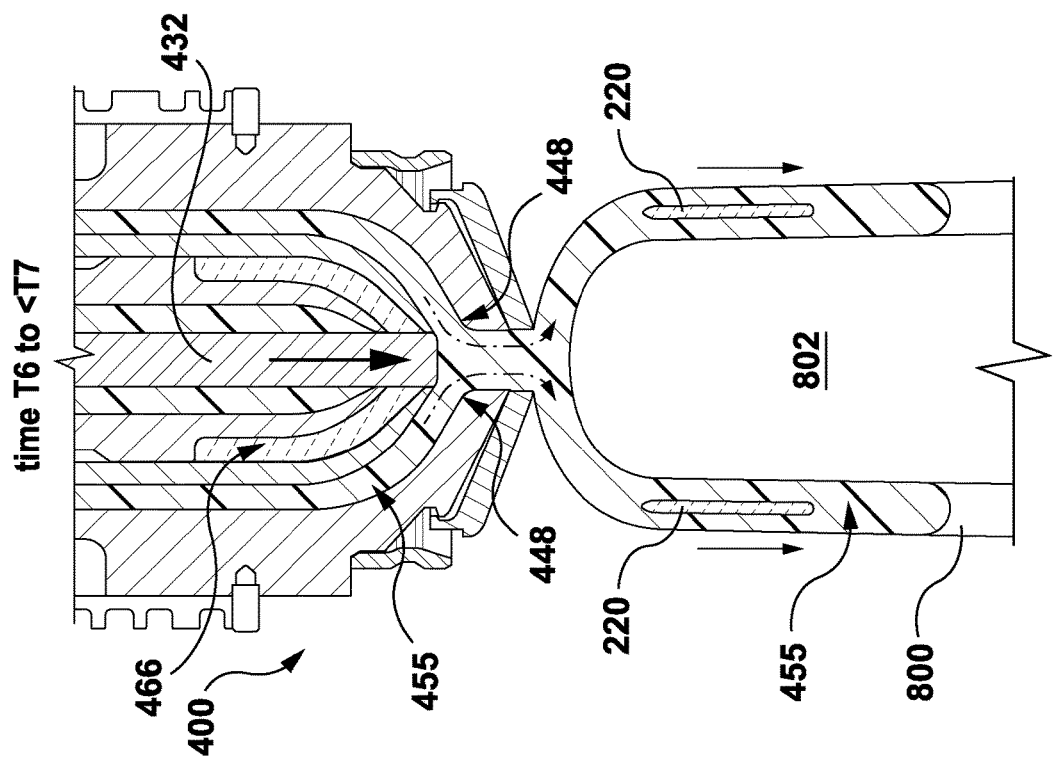

In a subsequent operation 508 (FIG. 5), controller 108 causes valve stem 432 to move from Position 2 back to Position 1 as shown in FIG. 12. This action closes the intermediate outlet 446 and thereby terminates the stream of internal layer material 466, which in turn completes injection of the current internal layer segment. Some minor "tailing" (thinning or tapering) of the trailing edge of the segment, which is not expressly depicted in FIG. 12 but is shown in FIG. 3, may occur, depending upon factors such as the speed at which the valve stem 432 is moved during closure of outlet 446 and the viscosity of the material 466. Surface layer material 455 to continue to flow from outer outlet 448, which remains open. Operation 508 occurs from time T6 to just before time T7 (see FIGS. 6 and 7). In FIG. 7, it can be seen that the velocity of the internal layer material 466 during time interval T6 to T7 is zero.

The inventor has determined that physically interrupting (mechanically blocking) the trailing edge of the internal layer material results in a generally well-defined trailing edge, with the exception that some minor tailing (i.e. a relatively short taper on the trailing edge) may occur. In contrast, the inventor has determined that merely stopping injection at the injection unit 106, without closing the intermediate outlet 446, tends to leave a long, tapered edge of internal layer material. Such a long, tapered edge may be unsatisfactory, e.g., because it differs in appearance from the generally blunt, rounded leading edge of the segment (see FIG. 3) or may bridge adjacent internal layer segments. Bridging may be undesirable for aesthetic reasons, e.g. if the intended effect is for each segment to be distinct.

It will be appreciated that operations 506 and 508 of FIG. 5 collectively result in the formation of the first internal layer segment 220 (see FIG. 12). Because surface layer material 455 continues to flow into the mold cavity 800 from outer outlet 448, the newly formed annular segment 220 is effectively pushed or urged axially about the core 802 towards the distal end of the mold cavity 800 (downwardly in FIG. 12).

Referring again to FIG. 6, it can be seen that, between time T6 and time T7, injection unit 106 suspends injection of internal layer material when the intermediate outlet 446 has closed. As such, the velocity of the internal layer material 466 between time T6 and time T7 is shown to be zero in FIG. 7. As will become apparent, injection by unit 106 shall be recommenced when the intermediate outlet 446 reopens for injection of each subsequent internal layer segment.

Figure 13:
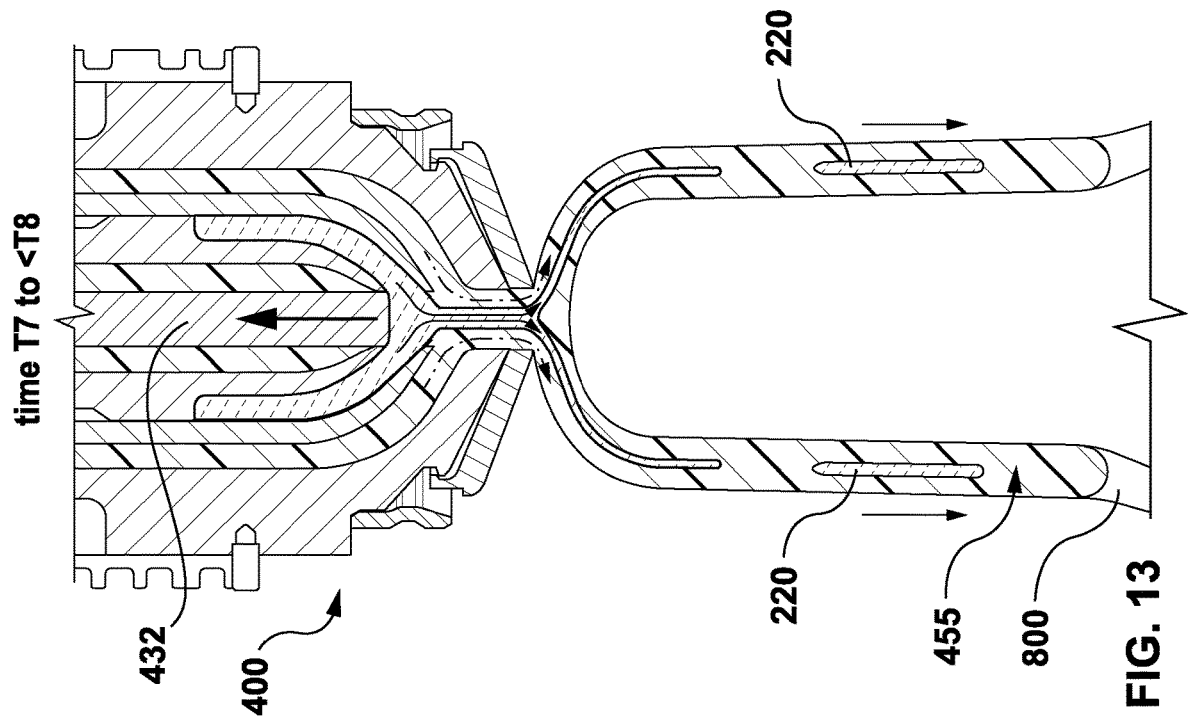
Figure 14:
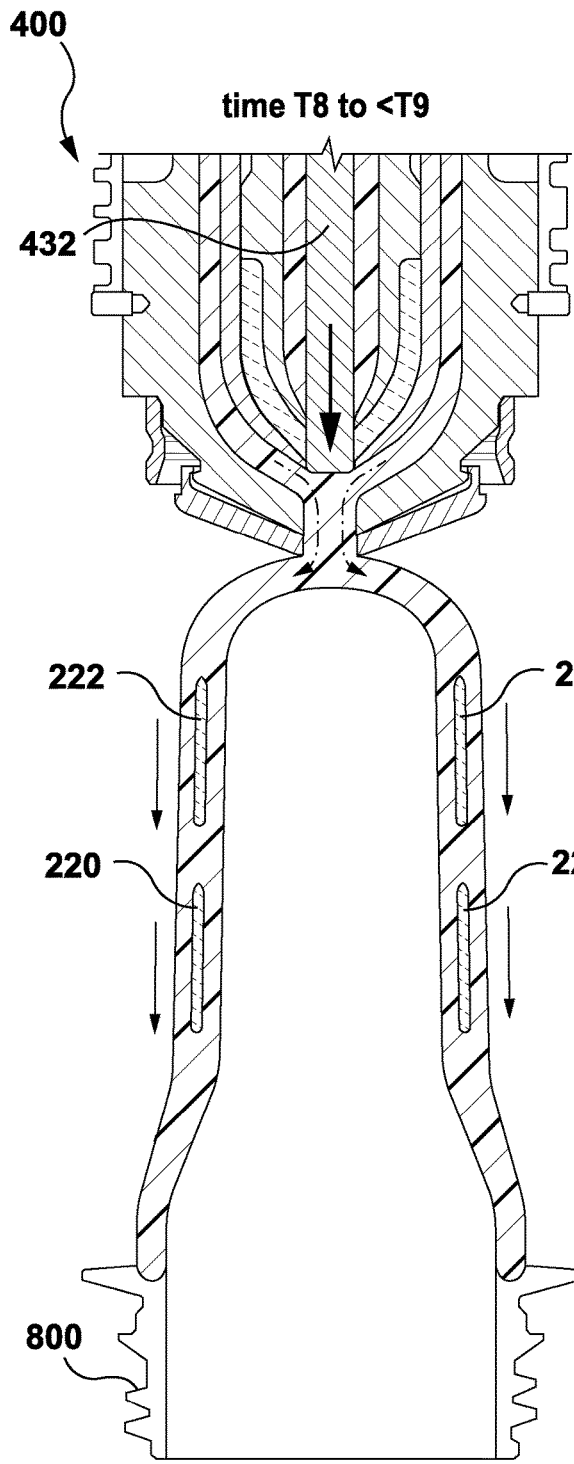
Figure 15:
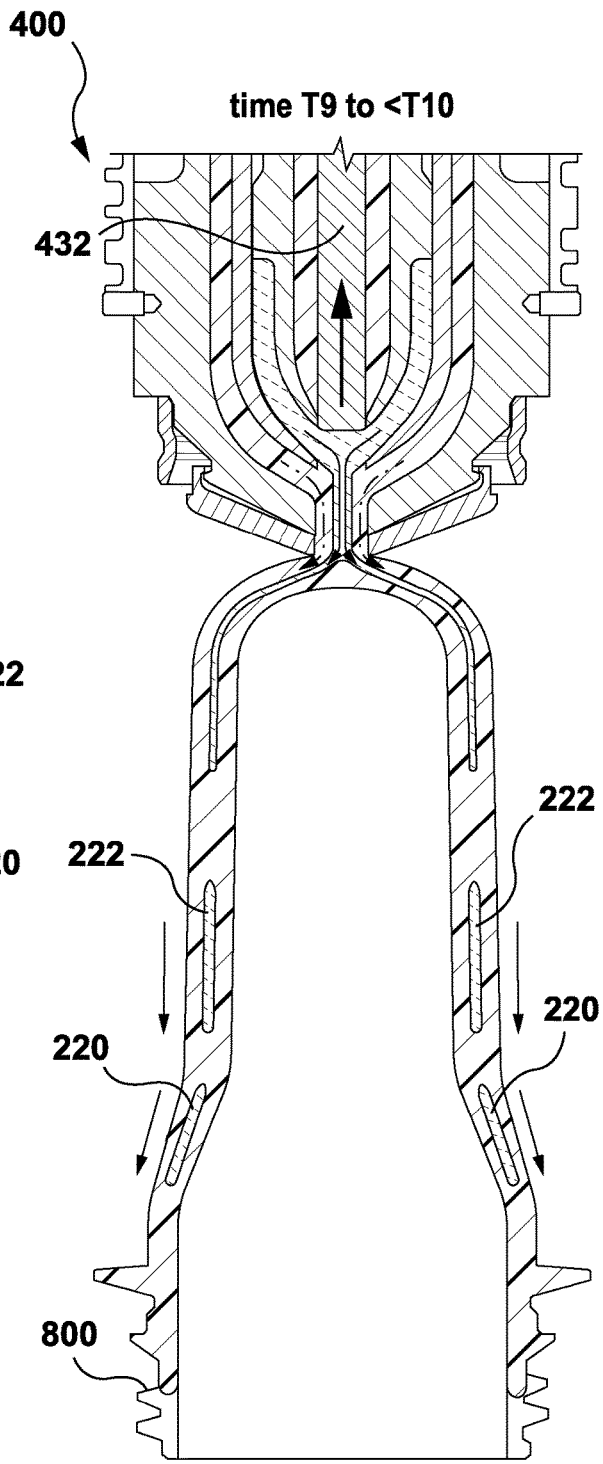
Figures 16, 17:
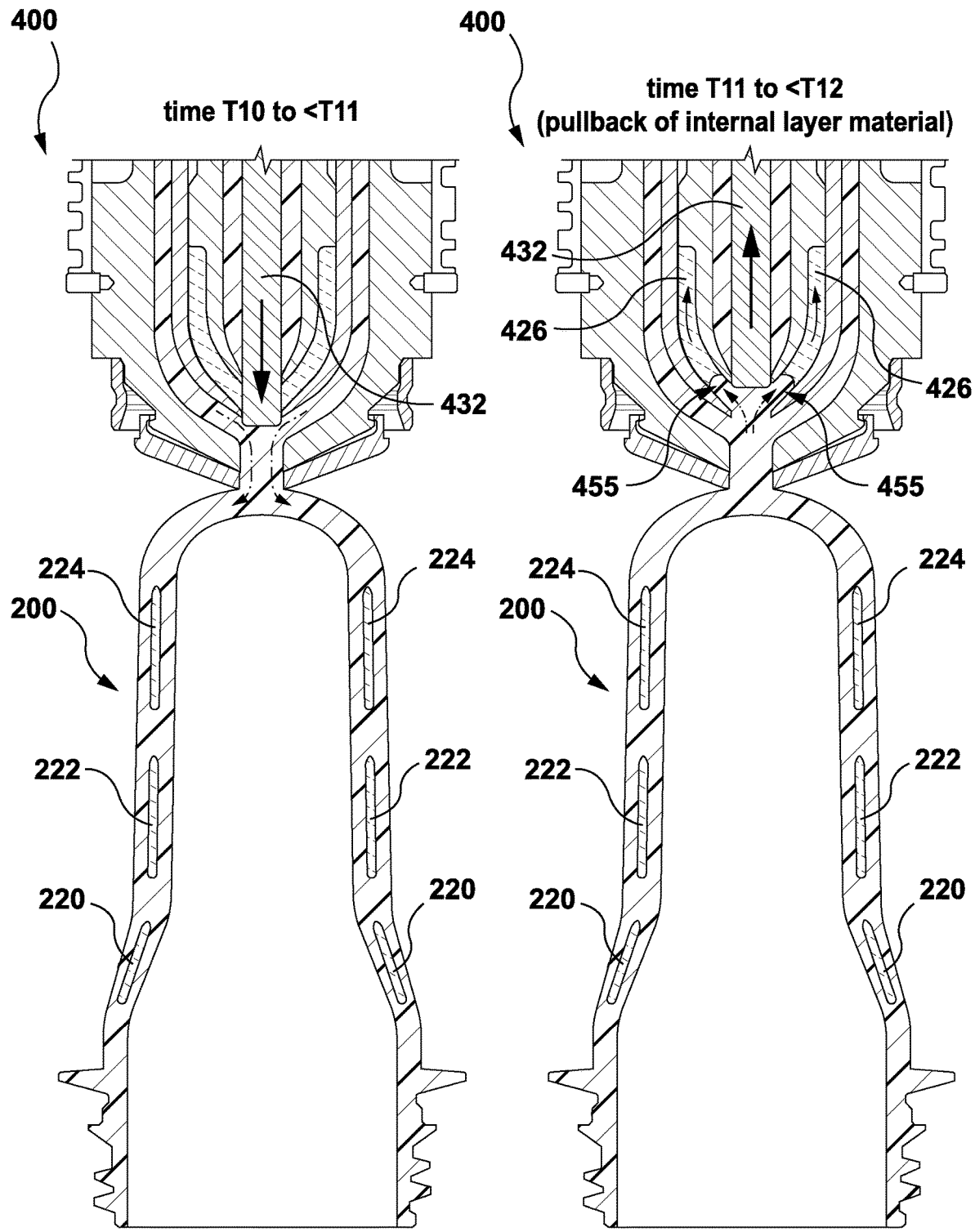

Referring back to FIG. 5, with formation of the first internal layer segment 220 having been completed, operations 506 and 508 are subsequently repeated, in sequence, once for each additional internal layer segment 222, 224 of preform 200 (see FIGS. 2 and 3). Referring to FIGS. 6 and 7, the first repeat of operations 506 and 508 for forming the next internal layer segment 222 occurs between time T7 and just before time T8 and between time T8 and just before T9, respectively. The second repeat of operations 506 and 508 for forming the last internal layer segment 224 occurs between time T9 to just before T10 and between time T10 and just before T11, respectively. FIGS. 13 and 14 depict the outcome of the first repeat of operations 506 and 508 respectively, whereas FIGS. 15 and 16 depict the outcome of second repeat of operations 506 and 508 respectively. As shown in FIG. 6, when the intermediate outlet 446 is closed, injection unit 106 suspends injection of internal layer material, between time T8 and time T9 and again between time T10 and time T11.

It is noted that, at or near time T11, controller 108 causes injection unit 104 to reduce the rate of surface layer material injection (see FIG. 6). This is done because, by time T11, the mold cavity 800 has been nearly filled with molding material. A slower rate of surface layer material injection continues past time T14, with the rationale of filling any gaps that may form in the mold cavity 800 as the molded article (preform 200) cools, shrinks, and hardens over time. Referring to FIG. 7, it can be seen that the velocity of the surface layer material injection begins to slow at or near time T11. Although not expressly depicted, the velocity may change at irregular intervals during this "hold phase," in response to irregular contractions of the preform 200 within the mold as it cools, e.g. if the injection unit 104 is operated on a pressure control versus velocity control basis.

At operation 510 (FIG. 5), the controller 108 reopens the intermediate outlet 446 by moving the valve stem 432 from Position 1 to Position 2. Operation 510 occurs from time T11 to just before time T12 in FIGS. 6 and 7. As illustrated in the schematic diagram of FIG. 17, with the intermediate outlet 446 open and with surface layer material 455 still flowing (albeit slowly) from outer outlet 448, the controller 108 causes the internal layer material injection unit 106 to pull back slightly. In FIG. 6, the pullback is evidenced by the segment of the plot 606 between times T11 and T12 having an upward trend (positive slope), i.e. showing reverse movement of the driving element of injection unit 106. In FIG. 7, the pullback is evidenced by the negative velocity of the internal layer material (plot 704) between times T11 and T12, i.e. by movement of the internal layer material 466 in the upstream rather than downstream direction within intermediate channel 426. The pullback has the effect of drawing a small amount of surface layer material 455 into the distal end of intermediate channel 426, which is done for the reasons mentioned hereinabove.

In the present embodiment, the controller 108 causes the internal layer material injection unit 106 to hold its position steady between times T12 and T13. This is done to give internal layer material time to flow into the intermediate channel 426. The reverse movement of the driving element between times T13 and T14 is for the purpose of drawing a new shot of internal layer material, from an upstream source, into injection unit 106 for the next molding cycle. In the present embodiment, a valve at or near the outlet of the injection unit 106 (not depicted) is closed before time T13 to facilitate this refilling of injection unit 106, particularly in view of the open state of the intermediate outlet 446 at that time (valve stem at position 2). The rationale for holding the outer outlet 448 open from time T12 to just before time T15 is top permit "packing" of the mold cavity with additional surface layer material, as the freshly molded preform cools and shrinks within the mold.

Finally, in operation 512 (FIG. 5), the controller 108 causes valve stem 432 to return to its original, fully closed position, i.e. Position 0. This closure has the effect of trapping a small amount of surface layer material in the distal end of the intermediate channel 426, in preparation for the next molding cycle. In the result, the state of the nozzle 400 at the conclusion of operation 512 will be the same its state as shown in FIG. 8.

In some embodiments, the injection unit 106 may adjust the pressure of the internal layer material 466 to different levels at different stages of the molding cycle. Such operation would entail at least one pressure-sensing transducer and may for example be controlled by suitable programming of controller 108.

In one example, the pressure of the internal layer material 466 may be increased to a higher level during the injection operation 506 and decreased to a lower level during subsequent operation 508 (FIG. 5). A possible rationale for these distinct pressure settings may be energy conservation or reducing a risk of internal layer material leaks at the intermediate outlet 446 of FIG. 4, as components of the nozzle 400 wear over time.

Figure 19:
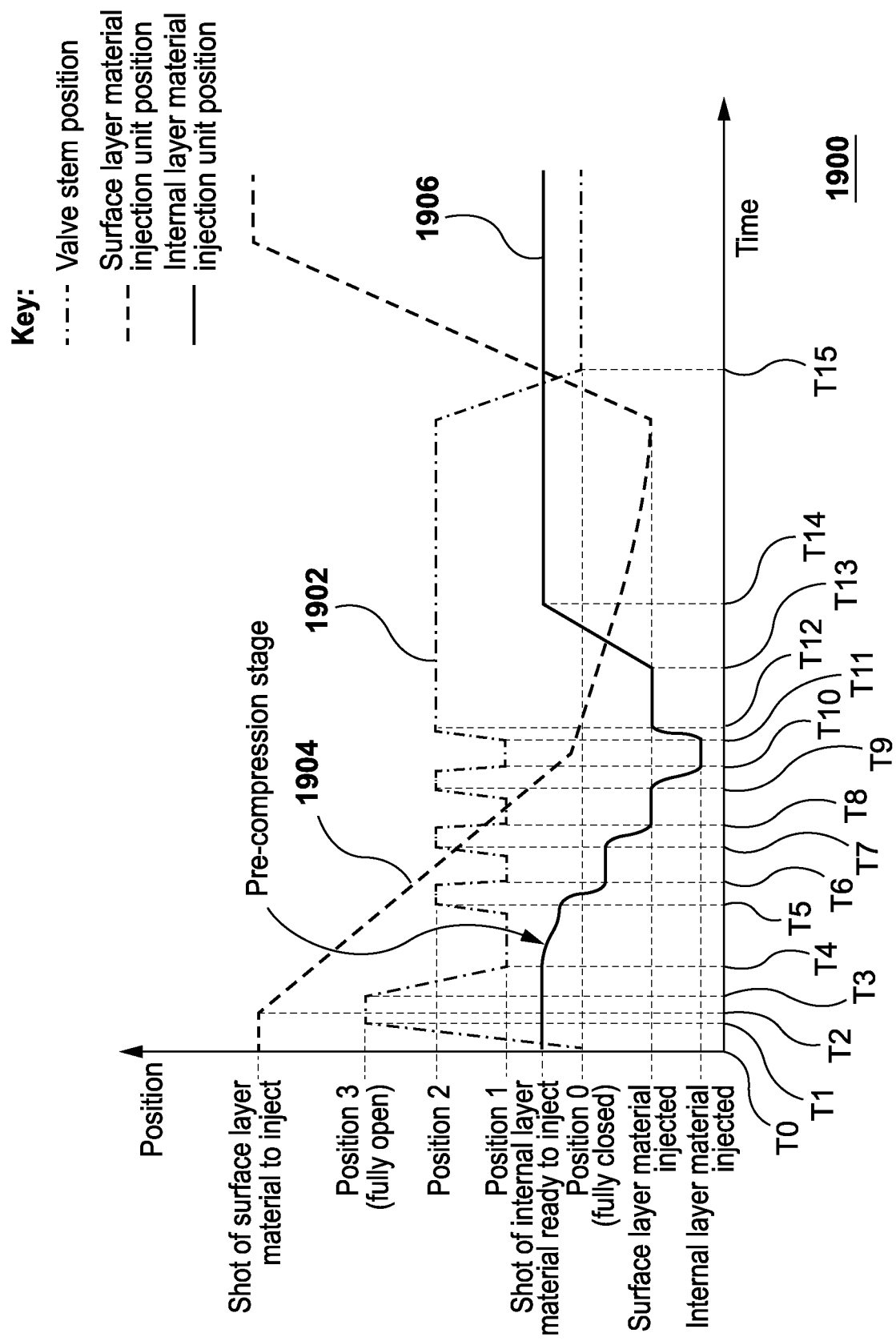
FIG. 19 is a graph showing the position of the valve stem, first injection unit, and second injection unit of the molding machine during a single injection molding cycle of another embodiment.
Figure 20:
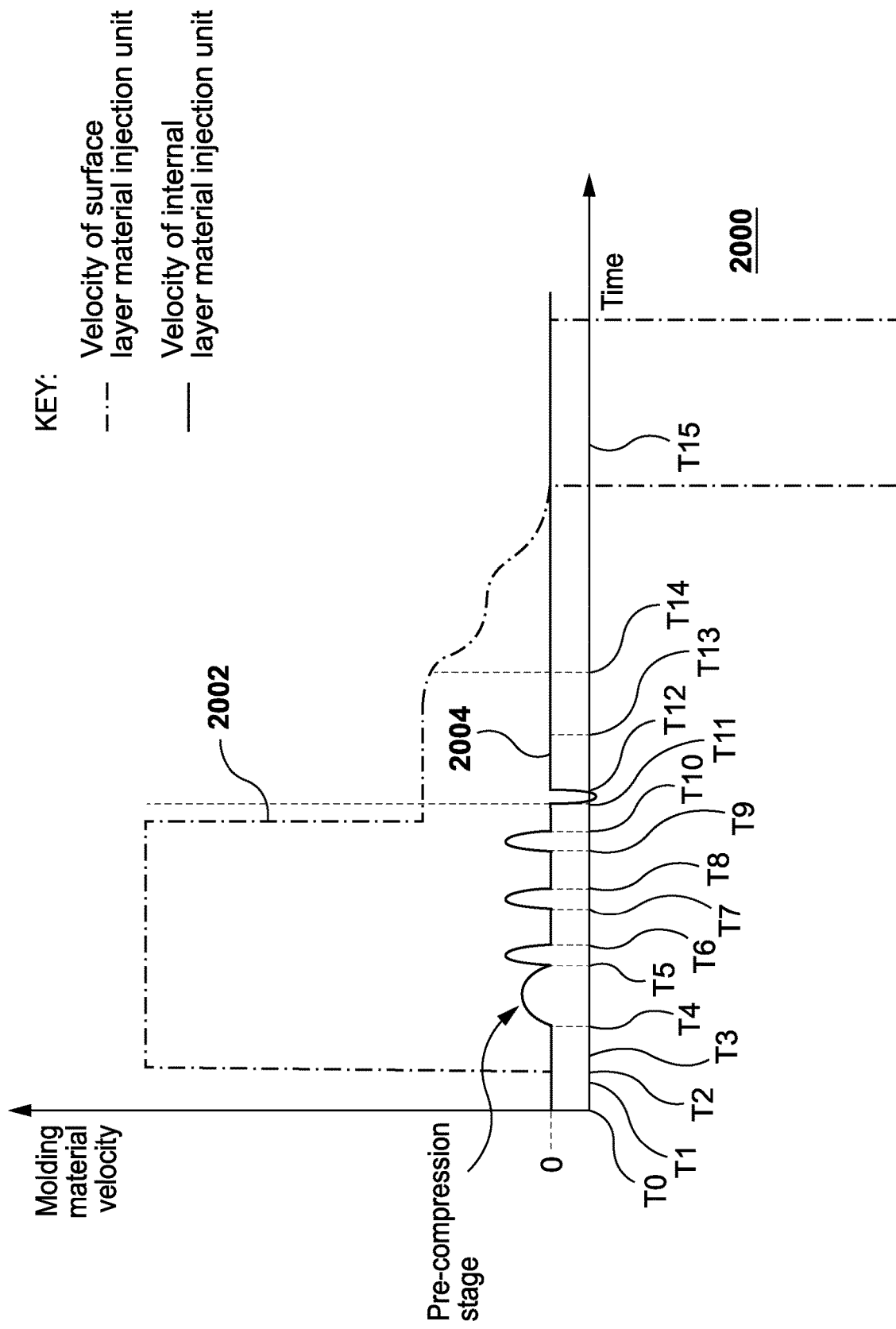
FIG. 20 is a graph showing the velocity of melted surface layer material and melted internal layer material during a single injection molding cycle of the alternative embodiment of FIG. 19.

In other embodiments, the controller 108 may be programmed to keep the pressure of the internal layer material 466 in injection unit 106 at a predetermined level even as segments are being formed during operations 506 and 508. FIGS. 19 and 20 illustrate the operation 500 (FIG. 5) of such an embodiment. For the purposes of FIGS. 19 and 20, it is presumed that the same molding machine hardware is being used to mold preforms 200, albeit using pressure-based control for injection unit 106.

FIG. 19 depicts a graph 1900, similar to graph 600 of FIG. 6, showing the positions of the valve stem 432, the injection unit 104, and injection unit 106 of molding machine 100 over the course of a single injection molding cycle. FIG. 20 depicts a graph 2000, similar to graph 700 of FIG. 7, showing the velocity of the surface layer material and of the internal layer material over the course of that injection molding cycle. For clarity, the conventions used in FIGS. 6 and 7 and the associated description above are maintained in FIGS. 19 and 20 and the following description.

Referring to FIG. 5, the present embodiment preforms the first operation 502 in the same manner as the above-described embodiment (see FIGS. 6 and 7).

In operation 504 (FIG. 5), controller 108 causes valve stem 432 to move from Position 3 to Position 1 to close both the inner outlet 444 and the intermediate outlet 446, in the same way as was described above. However, the manner in which the driving element of injection unit 106 is controlled in order to pre-compress the internal layer material 466 in nozzle 400 is different from that of the previously described embodiment. In particular, rather than causing the driving element to advance linearly, the controller 108 causes the driving element of injection unit 106 to advance non-linearly in a suitable manner for achieving and maintaining a predetermined target pressure of the internal layer material 466.

In particular, immediately after time T4 of the depicted example, the driving element velocity increases non-linearly, first slowly and then progressively more quickly, until the desired pre-compression to pressure is reached approximately midway between times T4 and T5. Thereafter, the velocity of the driving element is reduced to zero, quickly at the outset and then progressively more slowly, in a converse manner to the velocity increase. The non-linear velocity increase and decrease are shown in plot 2004 of FIG. 20 between times T4 and T5.

In the subsequent operation 506 (FIG. 5), which occurs from occurs from time T5 to just before time T6 of FIGS. 19 and 20, controller 108 opens intermediate outlet 446 to initiate formation of an internal layer segment. This action releases the pre-compressed internal layer material 466 into the molding cavity 800 via the gate area 430 of the nozzle 400, as shown in FIG. 11. The release of internal layer material 466 into cavity 800 results in a pressure drop of the material 466 in injection unit 106 shortly after time T5. Sensing this drop, the controller 108 advances the driving element of injection unit 106 with a view to restoring the target pressure. The velocity of the driving element increases non-linearly as during pre-compression operation 504. However, in operation 506, the velocity increase occurs more quickly, and the maximum velocity is greater, than during the preceding operation, in order to compensate for the outflow of internal layer material 466. Once the target pressure is reached, the velocity decreases in a converse, non-linear manner, as shown in plot 2004 of FIG. 20.

The subsequent operation 508 is performed in substantially the same way as in the earlier-described embodiment.

With formation of a first internal layer segment 220 having been completed, operations 506 and 508 are subsequently repeated, in sequence, once for each additional internal layer segment 222, 224 of preform 200 (see FIGS. 2 and 3). Referring to FIGS. 19 and 20, the first repeat of operations 506 and 508 for forming the next internal layer segment 222 occurs between time T7 and just before time T8 and between time T8 and just before T9, respectively. The second repeat of operations 506 and 508 for forming the last internal layer segment 224 occurs between time T9 to just before T10 and between time T10 and just before T11, respectively.

At operation 510 (FIG. 5), the controller 108 reopens the intermediate outlet 446 by moving the valve stem 432 from Position 1 to Position 2. Operation 510 occurs from time T11 to just before time T12 in FIGS. 19 and 20. As illustrated in the schematic diagram of FIG. 17, with the intermediate outlet 446 open and with surface layer material 455 still flowing from outer outlet 448, the controller 108 causes the internal layer material injection unit 106 to pull back slightly. In FIG. 19, the pullback is evidenced by the segment of the plot 1906 between times T11 and T12 having an upward trend (positive slope), i.e. showing reverse, non-linear movement of the driving element of injection unit 106. In FIG. 20, the pullback is evidenced by the negative velocity of the internal layer material (plot 2004), which changes non-linearly between times T11 and T12 as depicted. In the result, a small amount of surface layer material 455 is drawn into the distal end of intermediate channel 426.

In the present embodiment, the controller 108 causes the internal layer material injection unit 106 to hold its position steady between times T12 and T13. This is done to give internal layer material time to flow into the intermediate channel 426. The reverse movement of the driving element between times T13 and T14 is for the purpose of drawing in a new shot of internal layer material, from an upstream source, into injection unit 106 for the next molding cycle.

As the freshly molded preform 200 cools, hardens, and shrinks over time, gaps may form within the mold cavity 800. The filling of any such gaps with additional surface layer material 455 from outer outlet 448 may result in a decrease in pressure of that material in the upstream injection unit 104. If the pressure falls below a threshold, the controller 108 will automatically activate the driving element of injection unit 104 to restore and/or maintain the target pressure. In view of the possibly irregular timing of the gap formation during this interval, the surface layer injection unit 104 may have an irregular velocity profile after time T14, as shown in FIG. 20.

It will be appreciated that operation of the example embodiments of molding machine 100 described above represents a balancing of various, in some cases competing, interests, such as minimizing molding cycle time and promoting well-defined internal layer material segments.

More specifically, to minimize cycle time, physical blocking of internal layer material flow is used to terminate segments 220, 222, and 224 (operation 508). It has been found that the time required to terminate the flow of internal layer material by physical blocking is less than the time required to achieve the same result using pullback at the injection unit 106. Similarly, pre-compression of the internal layer material in parallel with an initial injection of only surface layer material (operation 504) may facilitate faster internal layer material flow when the intermediate outlet 446 is opened than if no such pre-compression were performed. The initial injection of the surface layer material 455 through inner outlet 444 and outer outlet 448 in operation 502 may also permit faster material flow in comparison to using only the outer outlet 448 during this stage.

Moreover, the combination of pre-compression (operation 504) and mechanical opening of intermediate outlet 446 (operation 506) to initiate each internal layer segment has been found to promote a well-defined leading edge of at least internal layer segments 222 and 224. It is noted that the leading edge of the first segment 220 of a molding cycle may be somewhat less well-defined, e.g. may be "wavy" circumferentially. If present, the less well-defined leading edge of the first segment 220 may be attributable to an inconsistent amount of surface layer material 455 pulled back into the distal end of the annular intermediate channel 426 at the conclusion of the previous molding cycle (see FIG. 17).

Conversely, the use of mechanical closure (physical blocking) of the intermediate outlet 446 to terminate each segment has been found to yield a well-defined trailing edge of internal layer material 466, e.g. in the sense that each segment has limited circumferential waviness and/or a reasonably short taper with minimal risk of bridging to the following segment.

Still other aspects of the machine operation described above promote long-term reliability. For example, operation 510 (FIG. 5) for pulling back the surface layer material into the distal end of the intermediate channel 426 permits use of nozzle 400 even when the valve stem 432 or intermediate outlet 446 begin to wear. In particular, even if the seal between these features becomes imperfect over time due to wear, whatever material may leak out between them in operations 502 or 508 will be surface layer material 455 rather than intermediate layer material 466, so the neck finish region or intra-segment areas of the molded article 200 will not be unduly comprised with the latter material.

Various alternative embodiments are contemplated.

In alternative embodiments, the nozzle 400 may be controlled to produce molded articles having a number, axial length, thickness, and/or placement of internal layer segments that is/are different from what is shown in FIGS. 2 and 3 above. FIGS. 18A, 18B, 18C, and 18D depict a number of example alternative preform designs.

Figure 18A:
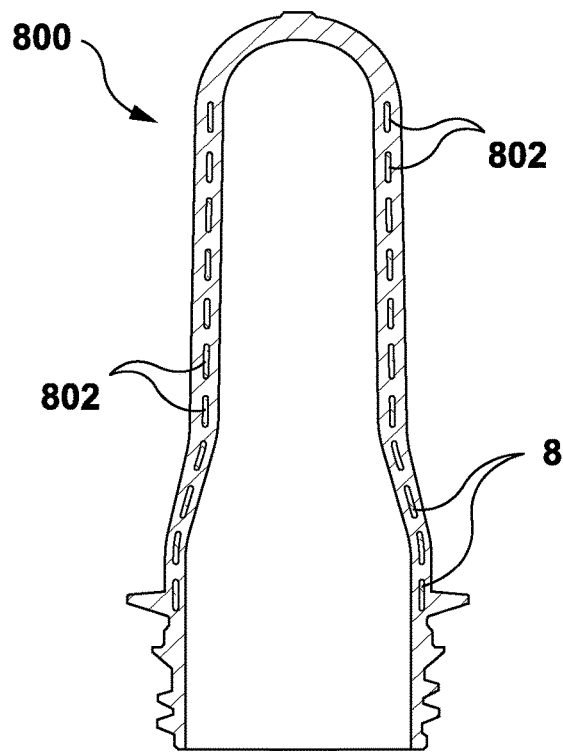
FIGS. 18A, 18B, 18C, and 18D are longitudinal cross sections of alternative preforms that can be molded by the molding machine of FIG. 1 or by similar molding machines.

Referring first to FIG. 18A, a first alternative preform 800 comprises eleven internal layer segments 802 of substantially uniform thickness and relatively short axial extent. To create such a preform 800, the valve stem 432 may be made to reciprocate between Positions 2 and 1 in operations 506 and 508 more quickly than for preform 200 by suitable programming of controller 108.

Figure 18B:
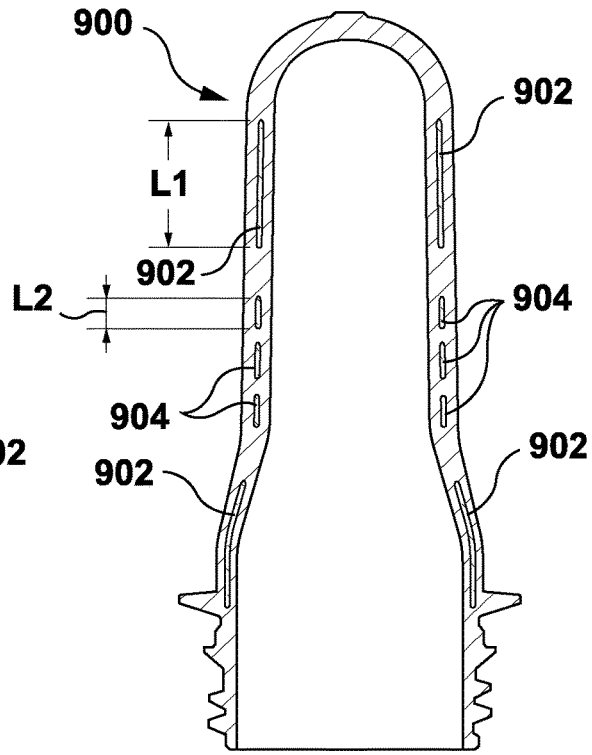

Referring next to FIG. 18B, the nozzle 400 may be alternatively controlled to mold a second alternative preform 900 comprising internal layer segments of different lengths (i.e. axial extents). For example, the preform 900 comprises two internal layer segments 902, one at each end of the preform 900, each having substantially the same axial extent L1. The preform 900 further comprises three internal layer segments 904, each having a second axial extent L2 smaller than the first. The axial extent of each internal layer segment may for example be set by programming the controller 108 to effect a suitable duration of releasing the internal layer material stream (i.e. the time interval between the opening and the subsequent closing of the intermediate outlet 446) in operations 506 and 508, with longer durations generally resulting in segments of longer axial extents. In the example preform 900 of FIG. 18B, all of the segments 902, 904 have a substantially uniform thickness, but this is not expressly required.

Figure 18C:
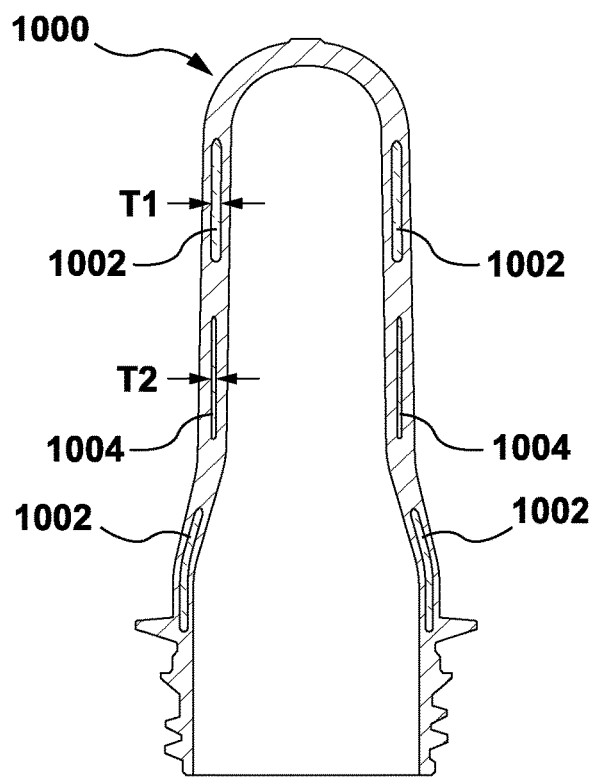
Figure 18D:
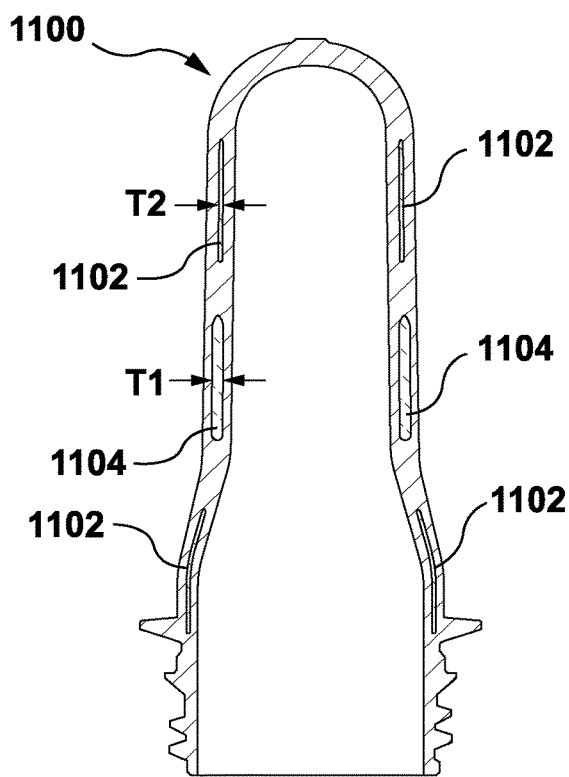

Some alternative preform designs comprise multiple thicknesses of internal layer segments, e.g. for aesthetic reasons. In FIG. 18C, preform 1000 defines a first type of segment 1002 of a first thickness T1 and a second type of segment 1004 of a second thickness T2 smaller than the first. In preform 1000, there are two instances of segment 1002, one on either side of a single instance of segment 1004. In FIG. 18D, the situation is reversed: preform 1100 defines two internal layer segments 1102 of a first thickness T2 and a third segment 1104 of a second thickness T1 greater than the first, disposed therebetween.

To control the thickness of each internal layer segment during coinjection, the controller 108 may open the intermediate outlet 446 to different extents (FIG. 4). For example, in one alternative embodiment, a new stop may be defined approximately midway (vertically in FIG. 4) between stops 1 and 2. When the end 433 of valve stem 432 is positioned at the new stop, the intermediate outlet 446 will be only partially open. Injection by unit 106 will cause internal layer material 466 to be discharged from the partially open intermediate outlet 446 in a thinner stream than when the intermediate outlet 446 is fully open as earlier described in conjunction with operation 506. In general, each stage of the back and forth movement of the valve stem 432 can be performed using different speeds, positioning, and/or timing to control internal material segment placement, thickness, and/or length within the molded article.

It will be appreciated that, in the pullback operation 510 (FIG. 5), the valve stem 432 could be positioned at Position 3 rather than Position 2. The latter position may however be considered preferable for reasons of energy conservation and/or injection molding cycle speed. The reason is that the distance of travel between Position 2 and each of the preceding Position 1 of operation 508 and the succeeding Position 0 of operation 512 is smaller than it would have been if operation 510 were performed with the valve stem 432 at Position 3.

It will also be appreciated that the pullback performed in operation 510 of FIG. 5 is not mandatory in all embodiments. For example, in some embodiments, the initial injection of only surface layer material 455 in operation 502 may be effected using only the outer channel 428, with the valve stem 432 in Position 1 (FIG. 4). In that case, the risk of internal layer material 466 bleeding from intermediate outlet 446 during the initial injection of surface layer material may be limited or avoided by fact that the outlet 446 is closed by the valve stem 432. Indeed, because such mechanical closure of intermediate outlet 446 is possible using valve stem 432 and is indeed performed in operation 508, it may be considered counterintuitive to utilize pullback in operation 510 in the same embodiment. To the extent that pullback is not performed in operation 510 in favor of mechanical closure of intermediate outlet 446 in operation 502, pre-compression of the internal layer material 466 could be commenced earlier than described above, e.g. in operation 502 rather than operation 504.

Fundamentally, alternative embodiments of nozzle 400 could be designed to mechanically open and close the inner, intermediate, and/or outer outlets in ways other than by reciprocation of a cylindrical valve stem in relation to those outlets. For example, one or more of the outlets could be implemented as a segmented annulus, with valve stem having corresponding flutes defined therein. In such implementations, an outlet could be opened by rotating the valve stem to bring the flutes into alignment with the open sections of the annulus and closed by rotating the valve stem to bring the flutes out of alignment with the open sections.

Other modifications may be made within the scope of the following claims.

What is claimed is:

1. A method of coinjection molding a multilayer article having a multi-segment internal layer, comprising:
    injecting a surface layer material into a mold cavity from at least one of an inner outlet and an outer outlet of a multi-channel nozzle; and
    intermittently injecting an internal layer material into the mold cavity from an intermediate outlet of the multi-channel nozzle such that the internal layer material is entirely encapsulated by the surface layer material, the intermediate outlet being between the inner and outer outlets of the multi-channel nozzle,
    wherein the injecting of the surface layer material into the mold cavity comprises:
        before the intermittent injecting of the internal layer material, injecting the surface layer material into the mold cavity from both of the inner outlet and the outer outlet of the multi-channel nozzle with the intermediate outlet in an open state; and
        throughout the intermittent injecting of the internal layer material, injecting the surface layer material into the mold cavity from only the outer outlet of the multi-channel nozzle with the inner outlet in a closed state, and
    wherein the intermittent injecting of the internal layer material is controlled, at least in part, by intermittent opening and closing of the intermediate outlet, and
    wherein the intermittent injecting of the internal layer material comprises:
        closing the intermediate outlet;
        pre-compressing the internal layer material in the multi-channel nozzle by activating an injection unit upstream of the intermediate outlet while the intermediate outlet is closed; and then
        forming each of a plurality of internal layer segments of the multilayer article by:
            opening the intermediate outlet of the multi-channel nozzle to release a stream of internal layer material with injection by activating the injection unit upstream of the intermediate outlet when the intermediate outlet opens for injection; and then
            closing the intermediate outlet of the multi-channel nozzle to terminate the stream of the internal layer material with suspending injection by the injection unit upstream of the intermediate outlet when the intermediate outlet has closed.

2. The method of claim 1 further comprising, for each of the plurality of internal layer segments of the multilayer article:
    upon the opening the intermediate outlet, activating the upstream injection unit to commence injection of the internal layer material from the intermediate outlet, wherein the activating includes non-linearly advancing a driving element of the injection unit; and
    upon the closing the intermediate outlet, deactivating the upstream injection unit.

3. The method of claim 1 wherein a first one of the plurality of internal layer segments has a first axial extent and wherein a second one of the plurality of internal layer segments has a second axial extent less than the first axial extent.

4. The method of claim 3 wherein the forming of the first and second internal layer segments comprises releasing the internal layer material from the intermediate outlet for first and second durations respectively, wherein the first duration is longer than the second duration.

5. The method of claim 1 wherein a first one of the plurality of internal layer segments has a first thickness and wherein a second one of the plurality of internal layer segments has a second thickness less than the first thickness.

6. The method of claim 5 wherein the opening of the intermediate outlet comprises, for the forming of the first internal layer segment of the first thickness, fully opening the intermediate outlet, and for the forming of the second internal layer segment of the second thickness, only partially opening the intermediate outlet.

7. The method of claim 1 wherein the multi-channel nozzle comprises a reciprocable valve stem, wherein each of the intermediate and outer outlets comprises an inwardly facing annular outlet, and wherein the intermittent opening and closing of the intermediate outlet comprises reciprocating the reciprocable valve stem between a first position in which the reciprocable valve stem does not block either of the intermediate or outer outlets and a second position in which the reciprocable valve stem blocks the intermediate outlet but does not block the outer outlet.

* * * * *